United States Patent
Tang et al.

(10) Patent No.: US 11,502,595 B2
(45) Date of Patent: Nov. 15, 2022

(54) VOLTAGE AND CURRENT PROTECTION IN ISOLATED SWITCHED-MODE POWER CONVERTERS WITH SECONDARY-SIDE RECTIFIED VOLTAGE SENSING

(71) Applicant: Infineon Technologies Austria AG, Villach (AT)

(72) Inventors: Benjamim Tang, Rancho Palos Verdes, CA (US); Hongying Ding, Redondo Beach, CA (US); Sue Perranoski, Rancho Palos Verdes, CA (US); Richard Pierson, Newport Beach, CA (US); Darryl Tschirhart, Cambridge (CA)

(73) Assignee: Infineon Technologies Austria AG, Villach (AT)

( * ) Notice: Subject to any disclaimer, the term of this patent is extended or adjusted under 35 U.S.C. 154(b) by 273 days.

(21) Appl. No.: 16/123,364

(22) Filed: Sep. 6, 2018

(65) Prior Publication Data
US 2020/0083813 A1  Mar. 12, 2020

(51) Int. Cl.
H02M 1/32 (2007.01)
H02H 7/125 (2006.01)
(Continued)

(52) U.S. Cl.
CPC ............ H02M 1/32 (2013.01); H02H 7/1252 (2013.01); H02M 3/33546 (2013.01);
(Continued)

(58) Field of Classification Search
CPC .............. H02M 1/32; H02M 3/33546; H02M 3/33569; H02M 3/33592; H02M 3/33576;
(Continued)

(56) References Cited

U.S. PATENT DOCUMENTS 5,862,044 A * 1/1999 Shioya .............. H02M 3/33523
363/21.07
6,486,642 B1   11/2002 Qian
(Continued)

FOREIGN PATENT DOCUMENTS

| EP | 1978625 A2 | 10/2008 |
| JP | 2015167443 A | 9/2015 |
| JP | 6293303 B2 | 2/2018 |

OTHER PUBLICATIONS

Tang, Benjamim, et al., "Feedforward Enhanced Feedback Control in Isolated Switched-Mode Power Converters with Secondary-Side Rectified Voltage Sensing", U.S. Appl. No. 16/109,254, filed Aug. 22, 2018.

Primary Examiner — Kyle J Moody
(74) Attorney, Agent, or Firm — Murphy, Bilak & Homiller, PLLC

(57) ABSTRACT

An isolated switched-mode power converter converts power from an input source into power for an output load. Power switches within a primary-side power stage control the amount of power input to the power converter and, ultimately, provided to the output load. A digital controller on the secondary side of the power converter generates signals to control the power switches. This controller also senses a rectified voltage on the secondary side of the power converter and uses this sensed voltage to detect fault conditions of the primary side. For example, the sensed rectified voltage is used to detect undervoltage or overvoltage conditions of the input power source of the power converter, or faulty power switches within the primary-side power stage.

20 Claims, 13 Drawing Sheets

(51) Int. Cl.
*H02M 3/335* (2006.01)
*H02H 7/12* (2006.01)

(52) U.S. Cl.
CPC ...... *H02M 3/33569* (2013.01); *H02H 7/1213* (2013.01); *H02H 7/1255* (2013.01); *H02M 3/33576* (2013.01); *H02M 3/33592* (2013.01)

(58) Field of Classification Search
CPC ... H02H 7/1252; H02H 7/1213; H02H 7/1255
See application file for complete search history.

(56) References Cited

U.S. PATENT DOCUMENTS

| | | | |
|---|---|---|---|
| 6,674,278 B1 | 1/2004 | Uesugi et al. | |
| 9,397,578 B2 | 7/2016 | Karlsson et al. | |
| 9,812,971 B1 | 11/2017 | Tschirhart et al. | |
| 9,812,979 B1 | 11/2017 | Tschirhart | |
| 9,825,546 B2 * | 11/2017 | Tang | H02M 3/33546 |
| 9,837,907 B1 | 12/2017 | Babazadeh et al. | |
| 9,929,663 B1 | 3/2018 | Babazadeh et al. | |
| 2004/0233685 A1 | 11/2004 | Matsuo et al. | |
| 2005/0226014 A1 | 10/2005 | Chang | |
| 2005/0286272 A1 | 12/2005 | Iwamoto et al. | |
| 2006/0139967 A1 | 6/2006 | Quitayen | |
| 2007/0247084 A1 | 10/2007 | Zhao | |
| 2008/0007977 A1 | 1/2008 | Piper et al. | |
| 2008/0055944 A1 | 3/2008 | Wang et al. | |
| 2009/0146643 A1 | 6/2009 | Ostrom et al. | |
| 2010/0109648 A1 | 5/2010 | Cheung | |
| 2010/0237843 A1 | 9/2010 | Rivet et al. | |
| 2011/0235374 A1 | 9/2011 | Myers et al. | |
| 2012/0062204 A1 | 3/2012 | Draxelmayr | |
| 2012/0218793 A1 | 8/2012 | Springett et al. | |
| 2013/0003420 A1 | 1/2013 | Ye | |
| 2013/0113286 A1 | 5/2013 | Farrenkopf | |
| 2013/0169212 A1 | 7/2013 | Sun et al. | |
| 2013/0308347 A1 * | 11/2013 | Sato | H02M 3/337 363/21.03 |
| 2014/0192565 A1 | 7/2014 | Wang | |
| 2014/0198535 A1 | 7/2014 | Yang et al. | |
| 2014/0254206 A1 | 9/2014 | Ou et al. | |
| 2014/0376281 A1 | 12/2014 | Ohashi | |
| 2015/0036394 A1 | 2/2015 | Yang et al. | |
| 2015/0070950 A1 * | 3/2015 | Myhre | H02M 1/32 363/53 |
| 2015/0091460 A1 * | 4/2015 | Kato | H02M 3/33553 315/200 R |
| 2015/0115911 A1 | 4/2015 | Parto et al. | |
| 2015/0115919 A1 | 4/2015 | Yang et al. | |
| 2015/0131333 A1 | 5/2015 | Grosso et al. | |
| 2015/0236596 A1 | 8/2015 | Fan | |
| 2015/0244279 A1 | 8/2015 | Takagi et al. | |
| 2015/0249391 A1 | 9/2015 | Yang et al. | |
| 2015/0268280 A1 | 9/2015 | Miljanic et al. | |
| 2015/0349573 A1 | 12/2015 | Tschirhart | |
| 2015/0365006 A1 | 12/2015 | Choi | |
| 2016/0028313 A1 | 1/2016 | Kong et al. | |
| 2016/0036340 A1 * | 2/2016 | Kikuchi | H02M 1/32 363/21.14 |
| 2016/0072392 A1 | 3/2016 | Soares et al. | |
| 2016/0072399 A1 * | 3/2016 | Kikuchi | H02M 3/33592 363/21.14 |
| 2016/0261200 A1 * | 9/2016 | Yabuzaki | H02M 1/32 |
| 2016/0352231 A1 * | 12/2016 | Quigley | H02M 3/33507 |
| 2016/0359418 A1 | 12/2016 | Kawashima | |
| 2017/0085184 A1 | 3/2017 | Lai | |
| 2017/0155335 A1 * | 6/2017 | Chang | H02M 1/08 |
| 2017/0163144 A1 * | 6/2017 | Boncato | H02M 1/32 |
| 2017/0179809 A1 * | 6/2017 | Choi | H02M 1/088 |
| 2017/0307662 A1 | 10/2017 | Miljanic et al. | |
| 2017/0317595 A1 | 11/2017 | Babazadeh et al. | |
| 2017/0331386 A1 | 11/2017 | Babazadeh | |
| 2018/0062523 A1 | 3/2018 | Rainer et al. | |
| 2018/0152111 A1 | 5/2018 | Tschirhart et al. | |
| 2018/0175738 A1 * | 6/2018 | Kikuchi | H02M 1/32 |
| 2019/0013727 A1 * | 1/2019 | Ke | H02M 1/08 |
| 2019/0260282 A1 * | 8/2019 | Oh | H02M 1/08 |

* cited by examiner

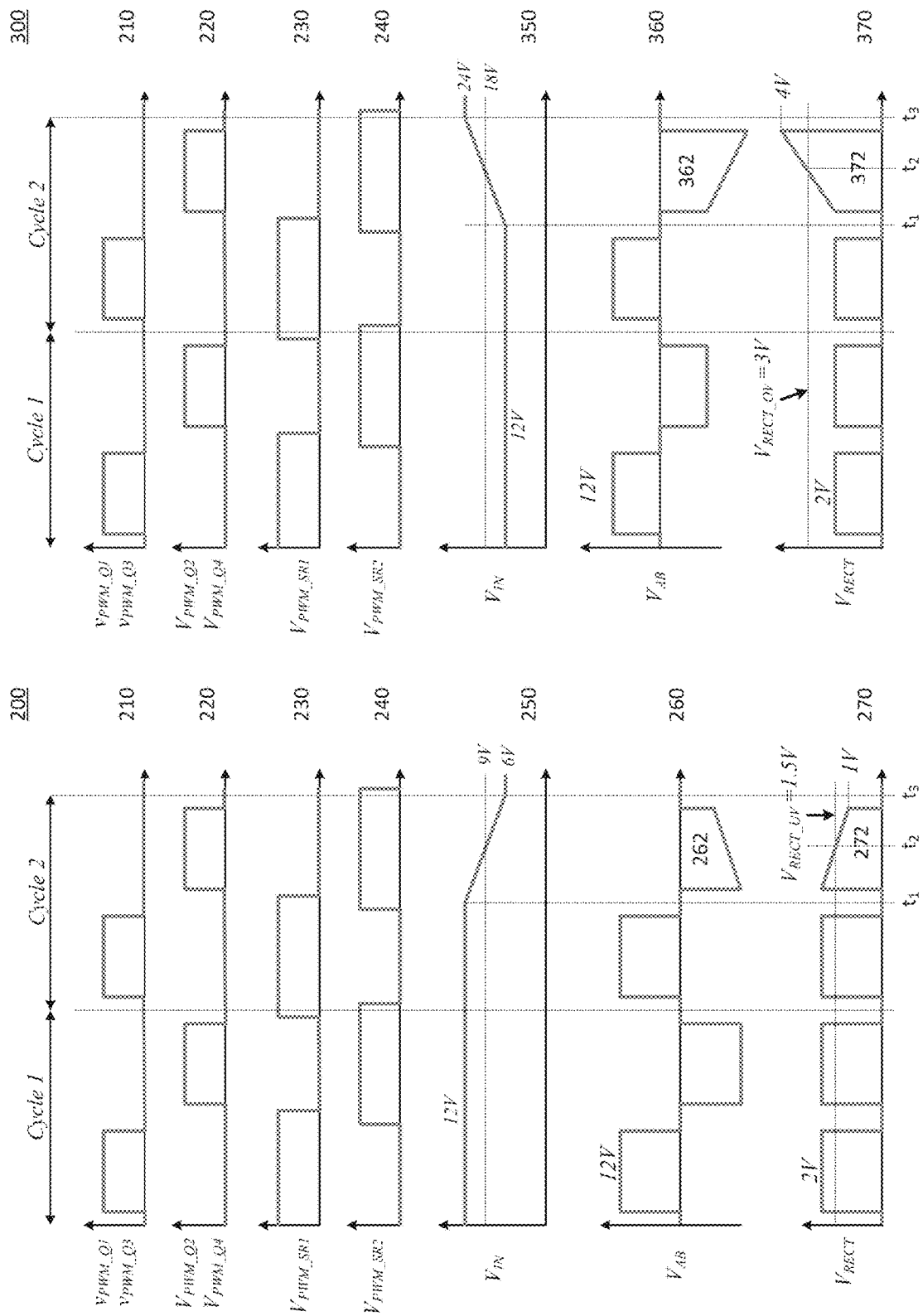

VOLTAGE AND CURRENT PROTECTION IN ISOLATED SWITCHED-MODE POWER CONVERTERS WITH SECONDARY-SIDE RECTIFIED VOLTAGE SENSING

TECHNICAL FIELD

The present application relates to isolated switched-mode power converters and, in particular, relates to techniques for detecting primary-side faults, wherein the techniques are based upon sensing a rectified voltage on the secondary side of a power converter.

BACKGROUND

Isolated switched-mode direct-current (DC) to DC power converters use a transformer to convert power from an input source into power for an output load. Such power converters include power switches that convert DC input power into alternating current (AC) power that is fed to the primary side of the transformer. AC power supplied on the secondary side of the transformer is rectified and filtered so as to provide DC power to the output load. The primary-side power switches are typically controlled by pulse-width-modulated (PWM) control signals. A controller generates the PWM control signals with a frequency and duty cycle that are appropriate to meet the power needs of the output load.

The controller typically uses a linear closed-loop feedback technique to maintain the output voltage near a desired target. The controller may be implemented using analog or digital circuitry, and may be located on the primary or secondary side of the power converter. So as to maintain the integrity of the isolation barrier of the power converter, any signals crossing between the primary and secondary sides must pass through isolators, e.g., transformers, opto-couplers. Locating a controller, analog or digital, on the primary side of the power converter provides the advantage that the input voltage and/or current may be readily sensed and used to detect primary-side fault conditions. However, such primary-side controllers have the disadvantage that one or more analog isolators must be used to transfer the output voltage and/or current information from the secondary to the primary side for purposes of implementing the closed-loop control. Furthermore, system managers are typically located on the secondary side, meaning that communication signals between a primary-side controller and any such system manager must also pass through isolators. For these reasons, as well as cost, size, and flexibility advantages, isolated switched-mode power converters increasingly use digital controllers that are located on the secondary side. Detection of fault conditions on the primary side of a power converter presents difficulties for a controller located on the secondary side of the power converter.

Techniques are desired for detecting primary-side fault conditions in an isolated switched-mode power converter, wherein the techniques are readily implemented within a secondary-side controller. These techniques should require minimal or no additional circuitry relative to the circuitry required for typical operation of the power converter.

SUMMARY

According to an embodiment of a switched-mode power converter having an isolated topology, the power converter converts power from an input source into power for an output load. The power converter comprises a primary side, a transformer, and a secondary side. The primary side includes a power stage which is coupled to the input source and which comprises one or more power switches. The power stage is coupled to a primary winding of the transformer. The secondary side includes a rectifier circuit, a filter circuit, and a controller. The rectifier circuit is coupled to a secondary winding of the transformer, and is configured to provide a first rectified voltage at a first rectified voltage node. The filter circuit is interposed between the first rectified voltage node and an output of the power converter. The filter circuit is configured to filter the first rectified voltage, thereby providing a filtered voltage at the output. The controller is configured to sense the first rectified voltage and, based upon this secondary-side voltage, to detect a primary-side fault condition. Responsive to such detection, a fault indication is generated and/or operation of the switched-mode power converter is modified.

According to an embodiment of an electronic system, the electronic system comprises an input power source, an output load, an isolated switched-mode power converter, and a system manager. The power converter is configured as described above. The system manager is configured to input a fault indication generated by the power converter and, responsive to determining that the fault indication indicates an unsafe operating condition or a condition likely to damage the electronic system, shut down the power converter.

According to an embodiment of a method, the method is performed within an isolated switched-mode power converter for converting power from an input source into power for an output load. The power converter comprises a primary side, a transformer, and a secondary side. The primary side includes a power stage which is coupled to the input source and which comprises one or more power switches. The power stage is coupled to a primary winding of the transformer. The secondary side includes a rectifier circuit, a filter circuit, and a controller. The rectifier circuit is coupled to a secondary winding of the transformer, and is configured to provide a first rectified voltage at a first rectified voltage node. The filter circuit is interposed between the first rectified voltage node and an output of the power converter. The method comprises sensing the first rectified voltage on the secondary side of the power converter and detecting, based upon this sensed voltage, a primary-side fault condition. The method further comprises generating a fault indication and/or modifying operation of the switched-mode power converter responsive to this detecting.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

FIG. 2 illustrates waveforms corresponding to voltages and control signals in the power converter of FIG. 1, for a scenario in which an undervoltage condition is detected.

FIG. 3 illustrates waveforms corresponding to voltages and control signals in the power converter of FIG. 1, for a scenario in which an overvoltage condition is detected.

DETAILED DESCRIPTION

Figure 1:
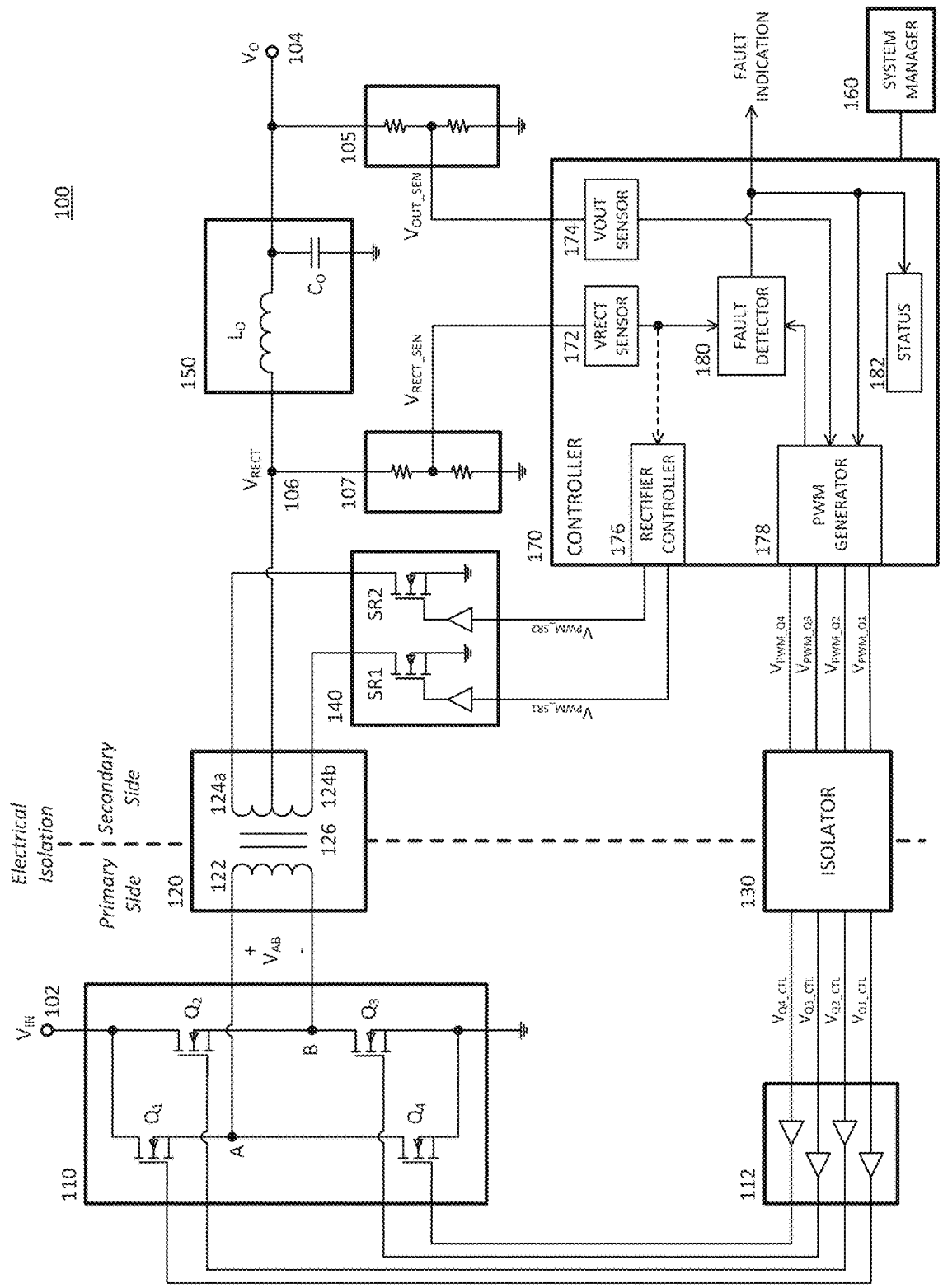
FIG. 1 illustrates a circuit diagram of an isolated switched-mode power converter in which a controller detects, based on a secondary-side rectified voltage, a primary-side fault condition.

The embodiments described herein provide techniques and circuits for detecting fault conditions of the primary side of an isolated switched-mode power converter. Unlike other techniques for detecting primary-side faults, the techniques described herein are based on sensing a rectified voltage on the secondary side of the isolated power converter. Hence, the described techniques are advantageously implemented within a digital controller that is located on the secondary side of an isolated power converter.

Locating the digital controller on the secondary side of an isolated power converter provides several advantages. For example, the controller can readily communicate, without use of any isolation circuitry, over a digital system bus with a system manager that is also located on the secondary side of the power converter. The system manager typically communicates directly with a load, e.g., a microprocessor, that is powered by the power converter, and may itself be powered by the isolated power converter. Hence, the system manager is preferably located on the secondary side. As another exemplary advantage for locating the controller on the secondary side, consider that a controller using closed-loop feedback techniques senses the output voltage, and possibly the output current, of the power converter, so as to generate control signals for power switches of the power converter. By locating the controller on the secondary side, such sensing does not require a signal corresponding to the output voltage to pass through analog isolation circuitry at the primary-to-secondary boundary of the power converter. In addition to adding cost and circuit size to an isolated power converter, such analog isolation circuitry undesirably introduces delay and some amount of noise in the sensed signal (s). Locating the controller on the secondary side of a power converter avoids these problems.

However, locating the controller on the secondary side presents some difficulties for detecting primary-side fault conditions such as undervoltage of the input power source, overvoltage of the input power source, or power switch failure. Detection of such faults typically relies upon sensing a voltage and/or current on the primary side of the power converter. Sensing of a primary-side voltage or current by a secondary-side controller requires that analog signals pass through isolation circuitry at the primary-to-secondary boundary of the power converter, if the integrity of the isolation barrier is to be maintained. Such isolation circuitry, particularly for supporting the transfer of analog signals, has nontrivial impacts on the cost and size of an isolated power converter, and is preferably avoided.

Embodiments of isolated switched-mode power converters described herein provide detection of primary-side fault conditions by a secondary-side controller. This detection does not require additional analog isolation circuitry for transferring a primary-side voltage or current across the primary-to-secondary boundary of the power converter. Instead, the fault detection is based upon a rectified voltage sensed at a rectified voltage node on the secondary side of the isolated power converter. In typical embodiments of the inventions, as exemplified in the circuitry of FIG. 1, the only required isolation circuitry (other than a transformer) comprises digital isolators which are used for passing switch control signals from the secondary-side digital controller to switches of a power stage that is located on the primary side of the isolated power converter.

Because voltage anomalies on the primary side of the power converter are propagated to the (secondary-side) rectified voltage node with little delay, the rectified voltage of the rectified voltage node may be used to quickly detect such primary-side voltage anomalies and, in response, generate associated fault indications. For example, a low voltage at an input power source to the power converter may be detected by sensing a low voltage at the rectified voltage node and, in response, an undervoltage fault indication is generated.

The rectified voltage might be sensed by the secondary-side controller for other purposes, e.g., active rectification, in which case no additional circuit components are required to implement the techniques herein. The rectified voltage may be used to estimate the input voltage or other primary-side voltages and to detect, with minimal delay, abnormalities in such voltages that are indicative of primary-side fault conditions. The rectified voltage node is coupled to a secondary winding of the isolation transformer, and is notably on the winding side of filtering circuitry that couples the secondary winding to the output (load) of the power converter. Thus, the rectified voltage does not incur the significant delay typically associated with secondary-side filtering circuitry between the transformer and the load, e.g., a low-pass filter comprised of an inductor and output capacitor. This allows fault detection, based on the rectified voltage, to respond quickly to primary-side faults, and has similar performance in terms of speed as would solutions requiring dedicated analog isolators to transfer a primary-side voltage across the primary/secondary boundary for sensing by a secondary-side controller. Notably, fault detection based upon the rectified voltage is able to detect primary-side faults significantly more quickly than detection techniques based upon the output voltage of the isolated voltage converter. (Techniques based upon the output voltage would incur a significant delay in detecting primary-side and associated fault conditions, as any primary-side voltage anomalies will incur a propagation delay through the filtering circuitry before being detectable at the output.)

Embodiments of power converter circuits and methods within power converters are provided in the following detailed description and the associated figures. The described embodiments provide particular examples for purposes of explanation, and are not meant to be limiting. Features and aspects from the example embodiments may be combined or re-arranged, except where the context does not allow this.

The techniques are described primarily in the context of DC-DC converters, but may also be used in AC-DC converters that use primary-side power switches and a transformer to control the power flow to a load. (These types of AC-DC converters may be considered as a primary-side AC rectifier which is coupled to an isolated DC-DC converter.)

The techniques are initially described for an embodiment of an isolated switched-mode power converter using a full-bridge power stage on the primary side and a center-tapped secondary winding. This is followed by descriptions of embodiments of methods for detecting, based upon sensing a rectified voltage on the secondary side of a power converter, different types of faults. The described techniques may be readily applied to power converters having other primary and secondary-side topologies. A sampling of such embodiments is described next, in which fault detection techniques based on a secondary-side rectified voltage are applied to power converters having other circuit topologies.

Power Converter Using Rectified Voltage Sensing to Detect Primary-Side Fault Conditions FIG. 1 illustrates an isolated switched-mode power converter 100 within which primary-side fault conditions are detected based upon a rectified voltage $V_{RECT}$ on the secondary side of the power converter 100. The power converter 100 includes an input 102, an output 104, a rectified voltage node 106, a power stage 110, a transformer 120, an isolator 130, a rectifier 140, a filter 150, a system manager 160, and a digital controller 170. The input 102 is for coupling to an input power supply, and is supplied with an input voltage $V_{IN}$. The output 104 is for coupling to an output load, e.g., a microprocessor, and provides an output voltage $V_O$. Electrical (galvanic) isolation is provided by the transformer 120 and the isolator 130, which together partition the power converter 100 into a primary side and a secondary side, as shown in FIG. 1.

The input voltage $V_{IN}$, from the input power supply, is provided to the power stage 110, which couples it to the transformer 120 using power switches. The illustrated power stage 110 includes four power switches $Q_1$, $Q_2$, $Q_3$, $Q_4$, which are oriented in a full-bridge configuration. The power switches are controlled via drivers 112 that are connected to switch control signals $V_{Q1\_CTL}$, $V_{Q2\_CTL}$, $V_{Q3\_CTL}$, $V_{Q4\_CTL}$ output from the isolator 130. During an active interval within a positive half cycle of the power converter 100, the switches $Q_1$ and $Q_3$ are set to conduct, thereby providing a positive voltage to the transformer 120 across its input $V_{AB}$. During an active interval within a negative half cycle of the power converter 100, the switches $Q_2$ and $Q_4$ are set to conduct, thereby providing a negative voltage to the transformer 120 across its input $V_{AB}$. Additionally, there may be idle intervals during which none of the switches $Q_1$, $Q_2$, $Q_3$, $Q_4$ conduct and no voltage is provided to the transformer 120 across $V_{AB}$. The ratio of the sum of the active intervals (positive and negative) to an overall switching period interval, which includes the active and idle intervals, of the power converter represents a power transfer duty cycle. This power transfer duty cycle determines the amount of power being transferred through the power converter.

The power switches $Q_1$, $Q_2$, $Q_3$, $Q_4$ illustrated in FIG. 1 are enhancement-mode metal-oxide-semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications.

The transformer 120 includes a primary winding 122 having N1 turns, secondary windings 124a, 124b having N2 turns each, and a core 126. The secondary windings 124a, 124b are connected together at a center tap. A rectified voltage node 106 having a rectified voltage $V_{RECT}$ is coupled to this center tap. Neglecting practical effects such as resistive losses and a leakage inductance of the transformer 120, the turns ratio N2/N1 determines the ratio of the rectified voltage $V_{RECT}$ to the input voltage $V_{AB}$ of the transformer 120.

The rectifier circuit 140 is configured to rectify the voltage output from the secondary windings 124a, 124b, so as to provide the rectified voltage $V_{RECT}$ at the rectified voltage node 106. As shown in FIG. 1, the rectifier circuit 140 comprises rectification switches SR1 and SR2, each of which has an associated driver. The rectification switches SR1, SR2 are controlled by a rectifier controller 176 within the controller 170. Other rectification circuits or techniques may be used. For example, diodes may couple each outer terminal of the secondary windings 124a, 124b to a rectified voltage node, while the center tap is coupled to a ground of the load. In another alternate configuration, four diodes in a bridge configuration may be used with a secondary winding that has no center tap. In general, diode-based rectification is not preferred, particularly for low secondary-side voltages, due to the power loss associated with diodes, as compared with active rectification using power switches SR1, SR2, as shown in FIG. 1. The illustrated rectification switches SR1, SR2 are enhancement-mode MOSFETS but, as with the power switches $Q_1$, $Q_2$, $Q_3$, $Q_4$, other switch types may be preferred in some applications.

The output filter 150 low-pass filters the rectified voltage $V_{RECT}$ using an output inductor $L_O$ and an output capacitor $C_O$. (Other filter types, including higher order filters and/or active filters, may be preferred in some applications.) The resultant filtered output voltage $V_O$ is provided to the output 104, for coupling to a load of the power converter 100. Note that the rectified voltage $V_{RECT}$ consists of a sequence of pulses having a frequency corresponding to a switching frequency of the power stage 110, whereas the filtered output voltage is relatively constant. Also, note that the filter 150 produces a significant delay between voltage changes at its input (rectified voltage node 106) and the output node 104, and that this delay is dependent upon the amount of current drawn by a load coupled to the output 104.

The system manager 160 communicates with the controller 170 over a digital system bus. The system manager 160 also communicates with other system components including, e.g., an input power supply and a load that is connected to the power converter 100. The system manager 160 performs tasks such as providing the controller 170 with a target output voltage, output current information, etc.

The controller 170 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 170 may also include memory, e.g., non-volatile memory such as flash, that includes instructions or data for use by the processor circuitry, and one or more timers. The controller 170 inputs sensor signals such as signals corresponding to $V_O$ and $V_{RECT}$.

The controller 170 is responsible for generating fault indications and for controlling the power converter 100 so as to supply necessary power to a load. The controller 170 senses the rectified voltage $V_{RECT}$ and the output voltage $V_O$, and uses the sensed voltages to generate control signals $V_{PWM\_SR1}$, $V_{PWM\_SR2}$, $V_{PWM\_Q1}$, $V_{PWM\_Q2}$, $V_{PWM\_Q3}$, $V_{PWM\_Q4}$ for controlling the power switches of the rectifier circuit 140 and the power stage 110. Additionally and as described in further detail below, the sensed rectified voltage $V_{RECT}$ is used to detect primary-side fault conditions. A conditioning circuit 107 conditions the rectified voltage $V_{RECT}$ to provide a voltage level $V_{RECT\_SEN}$ that is appropriate for sensing by a $V_{RECT}$ sensor 172 within the controller 170. While the conditioning circuit 107 is illustrated in FIG. 1 as a resistive voltage divider, it may additionally or alternatively include filters, amplifiers, etc. in some implementations. A similar conditioning circuit 105 conditions the output voltage $V_O$ to provide a voltage level $V_{OUT\_SEN}$ that is appropriate for sensing by a $V_{OUT}$ sensor 174. The conditioning circuit 105 is also shown as a resistive voltage divider, but may include other components in some applications. In a typical implementation, the sensors 172, 174 include analog-to-digital converters (ADCs), and the conditioning circuits 107, 105 translate the voltages $V_{RECT}$, $V_O$ to voltages that are within input limits (e.g., levels, frequencies) of these ADCs. In some implementations, the conditioning circuits 105, 107 may not be necessary, and the controller 170 may directly sense the voltages $V_{RECT}$, $V_O$.

The rectifier controller 176 generates control signals $V_{PWM\_SR1}$, $V_{PWM\_SR2}$ for the rectifier switches SR1, SR2 so as to provide the (non-negative) rectified voltage $V_{RECT}$ at the rectified voltage node 106. These control signals $V_{PWM\_SR1}$, $V_{PWM\_SR2}$ may be based upon a sensed version of the rectified voltage $V_{RECT}$, signals provided by the PWM generator 178, and/or a sensed current flowing through the rectifier switches SR1, SR2. (For ease of illustration, such current sensing is not shown.) Because such rectification techniques are well-known in the art, further detail regarding the rectifier controller 176 is not provided.

The controller 170 also includes a PWM generator 178, which generates switch control signals $V_{PWM\_Q1}$, $V_{PWM\_Q2}$, $V_{PWM\_Q3}$, $V_{PWM\_Q4}$ for controlling the power switches of the power stage 110. The PWM generator 178 typically includes a linear feedback controller, such as a proportional-integral-derivative (PID) controller. The PWM generator inputs a sensed version of the output voltage $V_O$, as provided by the $V_{OUT}$ sensor 174, and compares this voltage against a reference (target) voltage $V_{TARGET}$ to determine control parameters for generating the switch control signals. There are several control techniques that may be used by the PWM generator. For example, the PWM generator 178 might generate control signals having a fixed switching frequency and variable duty cycle, in which case the determined control parameter is a duty cycle. Alternatively, the PWM generator 178 might generate control signals having fixed pulse widths and variable frequencies, in which case the control parameter is a switching frequency. In another alternative, the PWM generator 178 may generate phase-shift-modulated (PSM) signals, in which case the control parameter is a phase shift. These and other techniques are well known within the field of feedback control. Because such techniques are well known and are not crucial to understanding the unique aspects of the inventions, which relate to fault detection, further details regarding control techniques are not provided herein.

The switch control signals $V_{PWM\_Q1}$, $V_{PWM\_Q2}$, $V_{PWM\_Q3}$, $V_{PWM\_Q4}$ output from the controller 170 are provided to the secondary side of the isolator 130 which, in turn, outputs the primary-side control signals $V_{Q1\_CTL}$, $V_{Q2\_CTL}$, $V_{Q3\_CTL}$, $V_{Q4\_CTL}$.

The controller 170 further includes a fault detector 180, which is configured to detect a fault condition of the primary side of the power converter. This detection is based upon sensing, via the $V_{RECT}$ sensor 172, the rectified voltage $V_{RECT}$ on the secondary side of the power converter. For some embodiments, the fault detection is further based upon information regarding the control signals for the switches of the power stage 110. For example, the PWM generator 178 may provide, to the fault detector 180, signals indicating timing (start times and/or time intervals) for positive and negative active voltage pulses that are expected to be applied to the transformer 120 by the power stage 110. The fault detector 180 may use such timing information from the PWM generator 178 to determine the timing of expected pulses within a waveform of the rectified voltage $V_{RECT}$. In response to detecting a fault condition, the fault detector 180 generates a fault indication.

The generated fault indication may be used within the controller 170 or may be output from the controller 170 for use by external circuits. When used internally, the fault indication may be used to update a status memory 182 (e.g., a register) that stores status information for the power converter 170. Additionally or alternatively, the fault indication may be provided to the PWM controller 178, thereby causing the PWM controller 178 to shut-down or alter its operation. For external use, the fault indication may be output from the controller 170 using, e.g., one or more fault indication pins or an external communication bus. (While illustrated in FIG. 1 as a separate connection, the fault indication may be provided over the same digital system bus that connects the system manager 160 to the controller 170.) The system manager 160, or some other circuit on the primary or secondary side of the controller 100, may input the fault indication and use it to alter operation of the power converter 100 or of an electronic system that includes the power converter 100.

There are several types of primary-side fault conditions that may be detected by the fault detector 180. The input power supply may provide an input voltage $V_{IN}$ that is higher or lower than an allowable (e.g., safe) operating range for the power converter 100. Such conditions should be detected and indicated. Primary-side hardware faults, such as switch faults (e.g., open faults or short faults) within the power stage 110, faults within the drivers 112, and faults (e.g., open circuit, core saturation) related to the primary winding 122, should also be detected and indicated.

Under normal operating conditions, positive and negative pulses based upon the input voltage $V_{IN}$ are applied to the transformer 120 across $V_{AB}$ and lead to corresponding (all positive) voltage pulses at the rectified voltage node 106. The voltage amplitude of pulses of the rectified voltage $V_{RECT}$ should, if practical effects such as transformer and switch losses are neglected, be related to the input voltage $V_{IN}$ according to the turns ratio (e.g., N2/N1) of the transformer 120. The power converter 100 may have an input overvoltage threshold $V_{IN\_OV}$ above which the power converter 100 cannot safely operate, and an input undervoltage threshold $V_{IN\_UV}$ below which the power converter 100 cannot safely operate or cannot supply adequate power to a load of the power converter. For example, the power converter 100 may have a nominal (expected) input voltage $V_{IN}$=12V and a transformer turns ratio of N2/N1=6, leading to a nominal rectified voltage $V_{RECT}$=2V during active pulses of the rectified voltage $V_{RECT}$. Input voltages higher than an overvoltage limit $V_{IN\_OV}$=18V may cause damage to the power switches $Q_1$, $Q_2$, $Q_3$, $Q_4$ or the transformer 120, whereas input voltages lower than an undervoltage limit $V_{IN\_UV}$=9V may be unable to supply adequate power to a load of the power converter or may cause excessive current within the switches of the power stage 110. For the transformer turns ratio N2/N1=6, these limits lead to a rectified voltage overvoltage threshold $V_{RECT\_OV}$=3V and a rectified undervoltage threshold $V_{RECT\_UV}$=1.5V.

The fault detector 180 detects a rectified voltage pulse based upon measurements of the rectified voltage $V_{RECT}$, determines a representative amplitude of the rectified voltage pulse, and compares this representative amplitude against the undervoltage and overvoltage thresholds $V_{RECT\_UV}$, $V_{RECT\_OV}$. Responsive to determining that the representative pulse amplitude is above the overvoltage threshold $V_{RECT\_OV}$=3V, the fault detector 180 generates an overvoltage fault indication. Responsive to determining that the representative pulse amplitude is below the undervoltage threshold $V_{RECT\_UV}$=1.5V, the fault detector 180 generates an undervoltage fault indication. In an alternative sub-embodiment, the fault detector 180 may generate a merged voltage fault indication when it is detected that the representative pulse amplitude is outside of the range between the undervoltage and overvoltage thresholds $V_{RECT\_UV}$, $V_{RECT\_OV}$.

The fault detector 180 may use measurements of the rectified voltage $V_{RECT}$ and the timing signals provided by the PWM generator 178 to detect missing pulses. The PWM generator 178 generates control signals directing the power switches $Q_1$, $Q_2$, $Q_3$, $Q_4$ to apply voltage pulses across the primary winding 122, i.e., across $V_{AB}$ in FIG. 1. For example, $V_{PWM\_Q1}$ and $V_{PWM\_Q3}$ may be set high for an active positive interval leading to a positive voltage pulse across $V_{AB}$, or $V_{PWM\_Q2}$ and $V_{PWM\_Q4}$ may be set high for an active negative interval leading to a negative voltage pulse across $V_{AB}$. The fault detector 180 determines whether the generated control signals led to a corresponding rectified pulse at the rectified voltage node 106, as is expected. If no corresponding rectified pulse is detected, the fault detector generates a missing-pulse fault indication.

The fault detector 180 uses measurements of the rectified voltage $V_{RECT}$ and, optionally, timing signals from the PWM generator 178 to detect asymmetry in voltage amplitudes of rectified voltage $V_{RECT}$ pulses. Rectified voltage pulses corresponding to expected positive and negative pulses across the primary winding 122 of the transformer should have the same voltage amplitudes. The fault detector 180 detects a first rectified voltage pulse corresponding to an expected positive primary-side voltage pulse and having a first voltage amplitude. The expected positive primary-side voltage pulse is determined based on timing signals provided by the PWM generator 178. The fault detector 180 detects a second rectified voltage pulse corresponding to an expected negative primary-side voltage pulse and having a second voltage amplitude. The expected negative primary-side voltage pulse is determined based on timing signals provided by the PWM generator 178. If the fault detector 180 determines that the difference between the first and second voltage amplitudes exceeds a voltage symmetry threshold, the fault detector 180 generates a voltage-asymmetry fault. Such voltage asymmetry may be caused by a failure to turn on a low-side switch in the primary-side power stage 110, e.g., due to a failure in a driver within the driver stage 112 or a failure within the isolator 130. (Body diodes within other switches of the power stage 110 may provide a current path, but lead to an abnormally low voltage level being applied to the transformer input $V_{AB}$.) Additionally, a bootstrap drive failure for a high-side switch of the power stage 110 may cause the high-side switch to fail to completely turn on.

The fault detector 180 uses measurements of the rectified voltage $V_{RECT}$ and timing signals from the PWM generator 178 to detect pulse interval faults of the rectified voltage $V_{RECT}$. The PWM generator 178 provides an active pulse interval to the fault detector 180. The active pulse interval corresponds to the time interval of a voltage pulse that the PWM generator 178 has directed, via generation of switch control signals $V_{PWM\_Q1}$, $V_{PWM\_Q2}$, $V_{PWM\_Q3}$, $V_{PWM\_Q4}$, to be applied to the primary winding 122 of the transformer 120. The fault detector 180 identifies a rectified voltage pulse of the rectified voltage $V_{RECT}$ that corresponds to the directed active pulse, and measures a rectified pulse width of the identified voltage pulse. The active pulse interval and the rectified pulse width should be the same, excepting practical considerations such as measurement tolerances, during normal operation. If the fault detector 180 detects that the difference between an active pulse interval and a corresponding rectified pulse width exceeds an acceptable tolerance threshold, the fault detector 180 generates a pulse-interval fault indication.

Described above are a variety of specific and exemplary fault indications that may be generated by the secondary-side controller 170. Note that this list is not exhaustive, and that other types of primary-side fault conditions may also be detected and indicated. Furthermore, the controller 170 need not be configured to detect and generate indications for all of the above primary-side fault indications; any subset of the above-described and other specific fault indications may be detected by the controller 170.

Scenarios for Using Rectified Voltage Sensing to Detect Primary-Side Fault Conditions The above-described techniques are further explained using the waveforms of FIGS. 2-5, which correspond to voltages within the power converter 100 of FIG. 1, or similar power converters. The scenarios corresponding to the illustrated waveforms relate to a variety of fault conditions that may exist on the primary side of a power converter.

FIG. 2 illustrates voltage waveforms 200 for a scenario in which an input voltage $V_{IN}$ supplied by a power supply falls below an undervoltage limit, as illustrated in the $V_{IN}$ waveform 250. This is detected by sensing that a rectified voltage $V_{RECT}$ falls below a rectified undervoltage limit $V_{RECT\_UV}$. Waveforms 210 correspond to switch control signals $V_{PWM\_Q1}$ and $V_{PWM\_Q3}$ which, when active, apply positive voltage pulses across a transformer input $V_{AB}$. Waveforms 220 correspond to switch control signals $V_{PWM\_Q2}$ and $V_{PWM\_Q4}$ which, when active, apply negative voltage pulses across a transformer input $V_{AB}$. Such switch control results in the illustrated voltage waveform 260 applied to the transformer input $V_{AB}$. The $V_{AB}$ waveform 260 alternates between positive and negative pulses. Waveforms 230, 240, corresponding to rectification switch control signals $V_{PWM\_SR1}$ and $V_{PWM\_SR2}$, illustrate that rectification switches, such as the switches SR1, SR2 illustrated in FIG. 1, serve to rectify the alternating pulses output from a transformer, thereby producing a rectified voltage $V_{RECT}$ as shown in the waveform 270. The rectified voltage $V_{RECT}$ is a rectified and down converted version of the voltage $V_{AB}$. (The turns ratio of the transformer is 6 in this example.)

As shown in the waveform 250, the input voltage $V_{IN}$ maintains a steady 12V level until time $t_1$, and then decreases to 6V at time $t_3$. This decrease results in a pulse 262 of the transformer input $V_{AB}$, wherein the pulse 262 has a decreasing voltage magnitude. A corresponding pulse 272 of the rectified voltage $V_{RECT}$ decreases from approximately 2V to approximately 1V as the input voltage $V_{IN}$ decreases between times $t_1$ and $t_3$. The rectified voltage $V_{RECT}$ decreases to an undervoltage threshold $V_{RECT\_UV}$=1.5V at time $t_2$. (This threshold corresponds to an input voltage threshold of 9V.) An undervoltage fault indication is generated responsive to detecting that the rectified voltage $V_{RECT}$ has fallen to the undervoltage threshold $V_{RECT\_UV}$=1.5V. In a first sub-embodiment, the undervoltage fault indication is generated immediately after a detection at time $t_2$. For example, the rectified voltage $V_{RECT}$ may be sampled at a high rate and the fault indication may be generated immediately upon detecting that a sample of the rectified voltage has fallen below the undervoltage threshold $V_{RECT\_UV}$=1.5V. In a second sub-embodiment, samples of the rectified voltage $V_{RECT}$ may be filtered (averaged), such that the detection and fault indication generation occur after a filter delay. In a third sub-embodiment, a single representative sample or filtered value, e.g., near the end of the pulse 272, may be used for the detection. For any of these sub-embodiments, the fault indication may be generated immediately upon detection, at the end of a half cycle of the power converter, e.g., after the pulse 272, or at the end of a cycle of the power converter, e.g., after Cycle 2 in FIG. 2.

FIG. 3 illustrates voltage waveforms 300 for a scenario in which an input voltage $V_{IN}$ supplied by a power supply rises above an overvoltage limit, as illustrated in the $V_{IN}$ waveform 350. This is detected by sensing that a rectified voltage $V_{RECT}$ rises above a rectified overvoltage limit $V_{RECT\_OV}$. The switch control waveforms 210, 220, 230, 240 are the same as described in relation to FIG. 2, and their description will not be repeated for the overvoltage scenario.

As shown in the waveform 350, the input voltage $V_{IN}$ maintains a steady 12V level until time $t_1$, and then increases to 24V at time $t_3$. This increase results in a pulse 362 of the transformer input $V_{AB}$, wherein the pulse 362 has an increasing voltage magnitude. A corresponding pulse 372 of the rectified voltage $V_{RECT}$ increases from approximately 2V to approximately 4V as the input voltage $V_{IN}$ increases between times $t_1$ and $t_3$. The rectified voltage $V_{RECT}$ increases to an overvoltage threshold $V_{RECT\_OV}$=3V at time $t_2$. (This threshold corresponds to an input voltage threshold of 18V.) An overvoltage fault indication is generated responsive to detecting that the rectified voltage $V_{RECT}$ has risen to the overvoltage threshold $V_{RECT\_OV}$=3V. The overvoltage fault indication may be generated according to the particular timing sub-embodiments described above for undervoltage fault indication, e.g., samples may be filtered, faults may be generated after a cycle.

Responsive to generation of an undervoltage or overvoltage fault indication, a controller or system manager may shut down the power converter or may alter its operational mode. While the waveforms of FIGS. 2 and 3 are described in the context of a full-bridge power stage such as that illustrated in FIG. 1, other topologies such as a half-bridge or active clamp flyback (ACF), operate similarly except with fewer switch control signals. For example, a half-bridge power stage could replace the full-bridge power stage 110 of FIG. 1 and the waveforms 200, 300 would apply, except that there would be no waveforms $V_{PWM\_Q3}$, $V_{PWM\_Q4}$.

Figure 4:
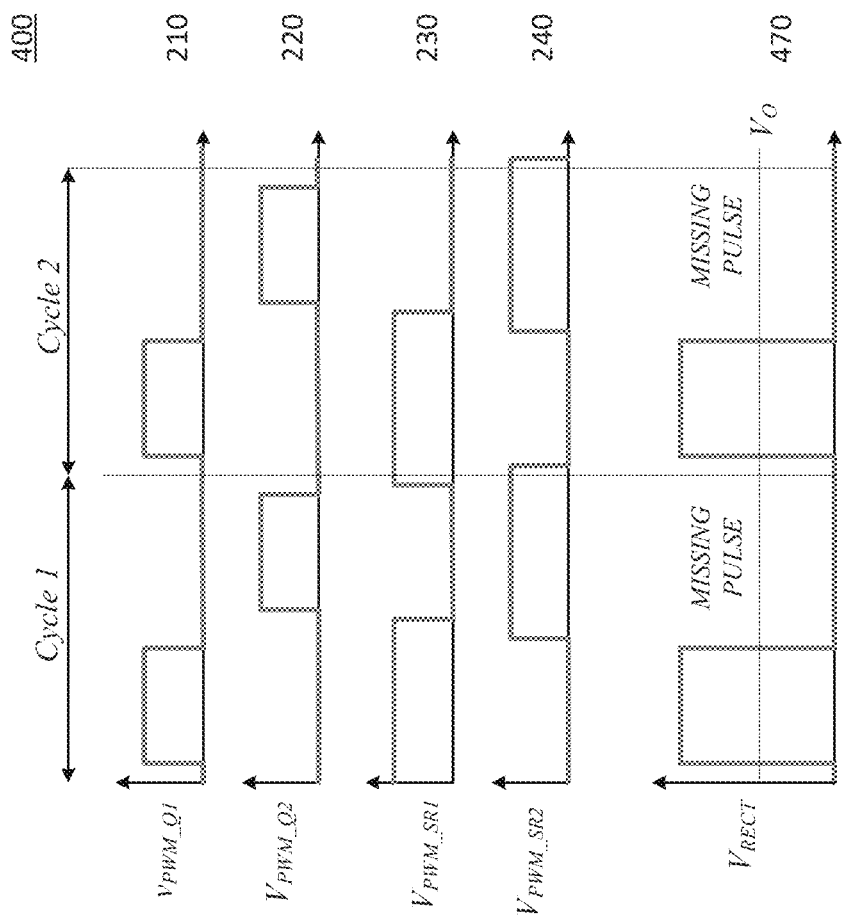
FIG. 4 illustrates waveforms corresponding to voltages and control signals in the power converter of FIG. 1, for a scenario in which a missing pulse is detected in the rectified voltage.

FIG. 4 illustrates voltage waveforms 400 for a scenario in which missing pulses are detected in a waveform 470 of the rectified voltage $V_{RECT}$. Switch control signals $V_{PWM\_Q1}$, $V_{PWM\_Q2}$, $V_{PWM\_SR1}$, $V_{PWM\_SR2}$ are generated, as shown in the waveforms 210, 220, 230, 240 and as described above. The rectified voltage $V_{RECT}$ waveform 470 includes pulses corresponding to positive pulses applied to the transformer across $V_{AB}$. However, there are no pulses corresponding to negative pulses applied to the transformer across $V_{AB}$. These missing pulses are detected and, responsive to this detection, a missing-pulse fault indication is generated.

FIG. 4 only illustrates two switch control signals $V_{PWM\_Q1}$, $V_{PWM\_Q2}$ for a power stage, as would be generated for a half-bridge or ACF topology. Similar waveforms would also apply for a full-bridge topology, except two additional switch control signals would be provided.

Missing pulses may be caused, e.g., by a faulty switch (open-circuited, short-circuited) in the primary-side power stage or by a faulty driver 112. For the illustrated waveforms, the power switch $Q_2$ of a half-bridge power stage or its driver may have failed, or either of the power switches $Q_2$, $Q_4$ of a full-bridge power stage or their respective drivers may have failed. Regardless of the root cause of the fault, a missing-pulse fault often leads to unsafe operation of a power converter. For example, missing pulses for the positive or negative half cycles will lead to a flux imbalance in the transformer which, if not mitigated, will lead to flux saturation and associated excessive primary-side current and heat. In addition to likely further damage to the power stage 110 or the transformer 120, excessive primary-side current may have damaging impacts outside of the power converter 100, e.g., the power source supplying power to the power converter 100 could be damaged due to the excessive current levels. For at least these exemplary reasons, missing-pulse faults typically force a shut down of the power converter so as to prevent further damage and/or prevent unsafe operation. While the descriptions herein focus on primary-side faults, it should be noted that a missing pulse may also be caused by a rectifier switch failure, e.g., a shorted rectification switch SR1 in FIG. 1 also leads to missing pulses as illustrated in FIG. 4.

Figure 5:
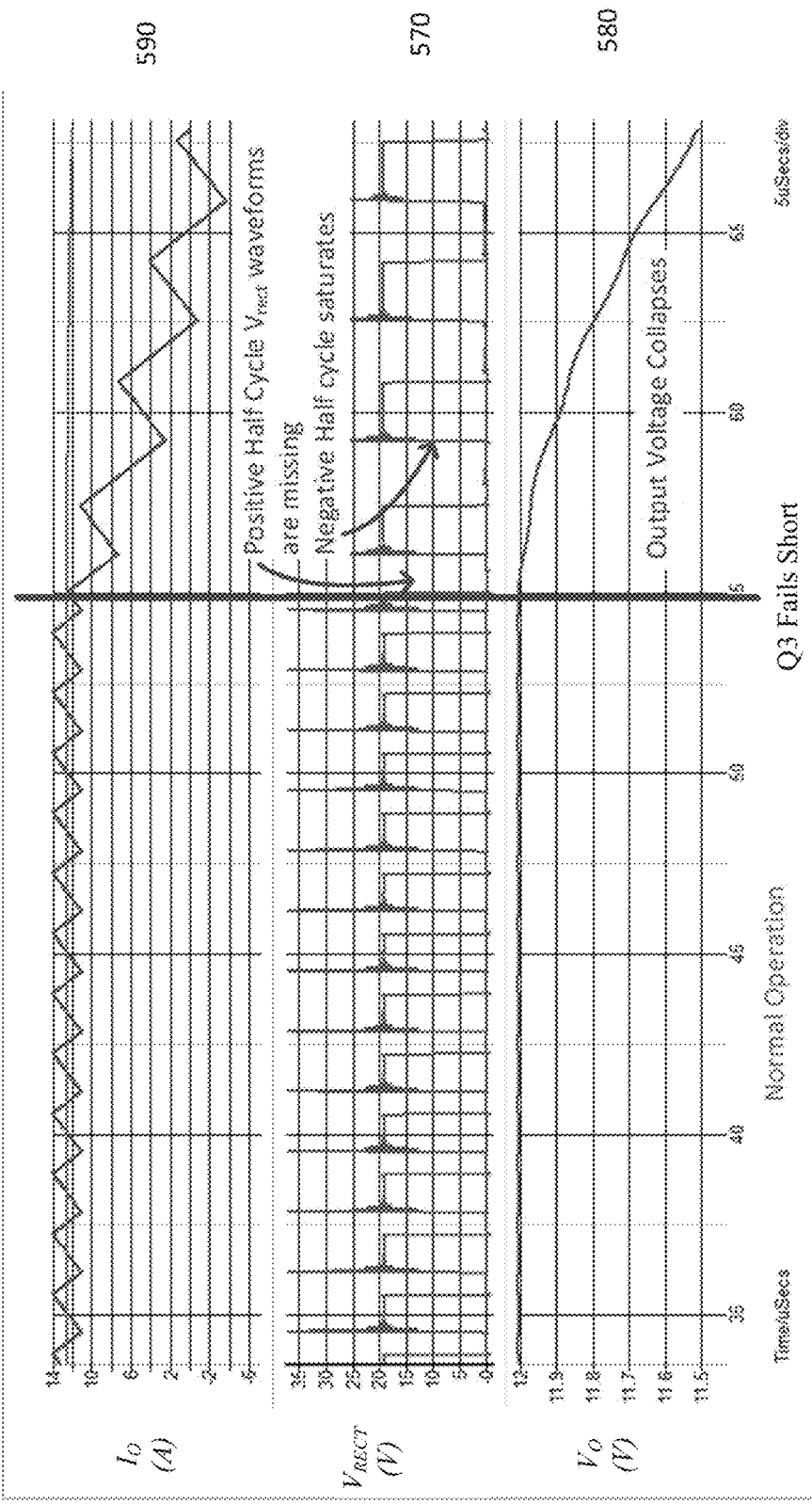
FIG. 5 illustrates voltage and current waveforms corresponding to a scenario in which a power switch fails.

FIG. 5 illustrates voltage waveforms 500 similar to the waveforms 400 of FIG. 4, but corresponding to a specific scenario wherein a power switch fails short in the power converter 100 of FIG. 1 and in which a missing-pulse indication is not promptly generated. The power converter 100 operates normally until time t=55 µsec, at which point the power switch $Q_3$ fails short. Subsequent to this failure, the power stage 110 is unable to apply positive voltage pulses to the transformer 120; only negative voltage pulses are applied across $V_{AB}$. As illustrated in the waveform 570, the rectified voltage $V_{RECT}$ only includes voltage pulses corresponding to negative pulses applied to the transformer 120. The closed-loop control of the PWM generator 178 increases the duty cycle in an attempt to compensate for the missing power transfer that would normally occur for the positive voltage pulses. However, the power converter 100 is unable to transfer enough power using only negative pulses, leading to a collapse in the voltage $V_O$ and a decrease in the output current $I_O$ that flows through the output inductor $L_O$, as illustrated in the waveforms 580, 590. A duty cycle used for producing the PWM control signal saturates, thereby providing rectified voltage pulses corresponding to negative voltage pulses input to the transformer 120 at $V_{AB}$, and having a duty cycle approaching 50%.

If the fault detection relied upon sensing the output voltage $V_O$, the slow decrease in the output voltage $V_O$ would lead to a fault detection occurring well after a fault condition occurs. This is due to the delay caused by the filter 150, including the output capacitor $C_O$. In particular, if a load connected to the power converter 100 is drawing little or no current, the output capacitor $C_O$ will maintain the output voltage $V_O$ near its desired target, and a primary-side fault, such as a power stage switch fault, may not be detected at all or may be detected well after it occurs, thereby resulting in potentially unsafe operation of or further damage to the power converter 100.

Rather than identifying missing pulses in the rectified voltage $V_{RECT}$ to detect a primary-side fault, saturation of a duty cycle of the rectified voltage $V_{RECT}$ may be used to detect a fault. In the scenario of FIG. 5, the fault detector 180 may detect at or after t=60 µsec that the duty cycle of the rectified voltage $V_{RECT}$ waveform is saturated, e.g., near 50%. Responsive to such detection, the fault detector may generate a saturated-duty-cycle fault indication.

Figure 6:
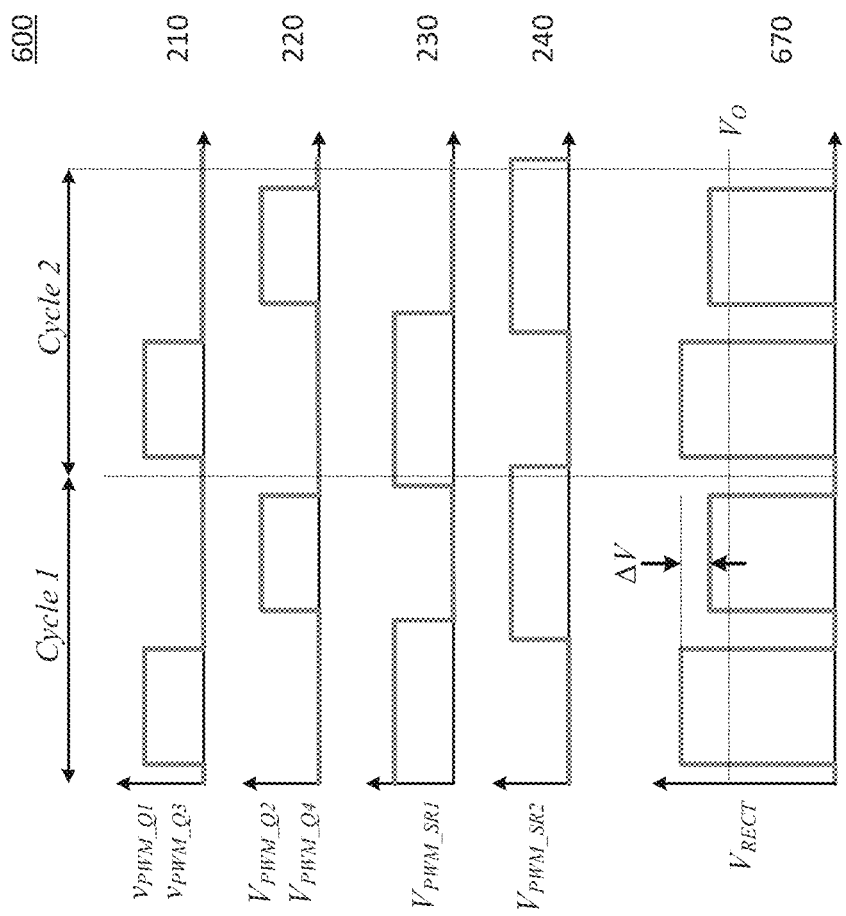
FIG. 6 illustrates voltage and control signal waveforms for a scenario in which it is detected that pulses of the rectified voltage are not symmetric.

FIG. 6 illustrates voltage waveforms 600 for a scenario in which asymmetric pulses are detected in a waveform 670 of the rectified voltage $V_{RECT}$. Switch control signals $V_{PWM\_Q1}$, $V_{PWM\_Q2}$, $V_{PWM\_Q3}$, $V_{PWM\_Q4}$, $V_{PWM\_SR1}$, $V_{PWM\_SR2}$ are generated, as shown in the waveforms 210, 220, 230, 240 and as described above. The rectified voltage $V_{RECT}$ waveform 670 includes pulses corresponding to positive and negative pulses applied to the transformer across $V_{AB}$. However, the rectified voltage pulses corresponding to the positive pulses differ from the rectified voltage pulses corresponding to the negative pulses by a voltage difference $\Delta V$. If this voltage difference $\Delta V$ exceeds a threshold $\Delta V_{THR}$, a voltage-asymmetry fault indication is generated.

Methods for Detecting Primary-Side Faults Based on Rectified Voltage

Described below are embodiments of methods for detecting primary-side faults based upon a rectified voltage that is sensed on the secondary side of an isolated switched-mode power converter. These methods may be implemented within a power converter such as that illustrated in FIG. 1. For simplicity of explanation, the embodiments are described separately for different types of fault indications. It should be understood that these embodiments can be combined, and typical preferred embodiments may detect several different types of fault conditions.

Figure 7:
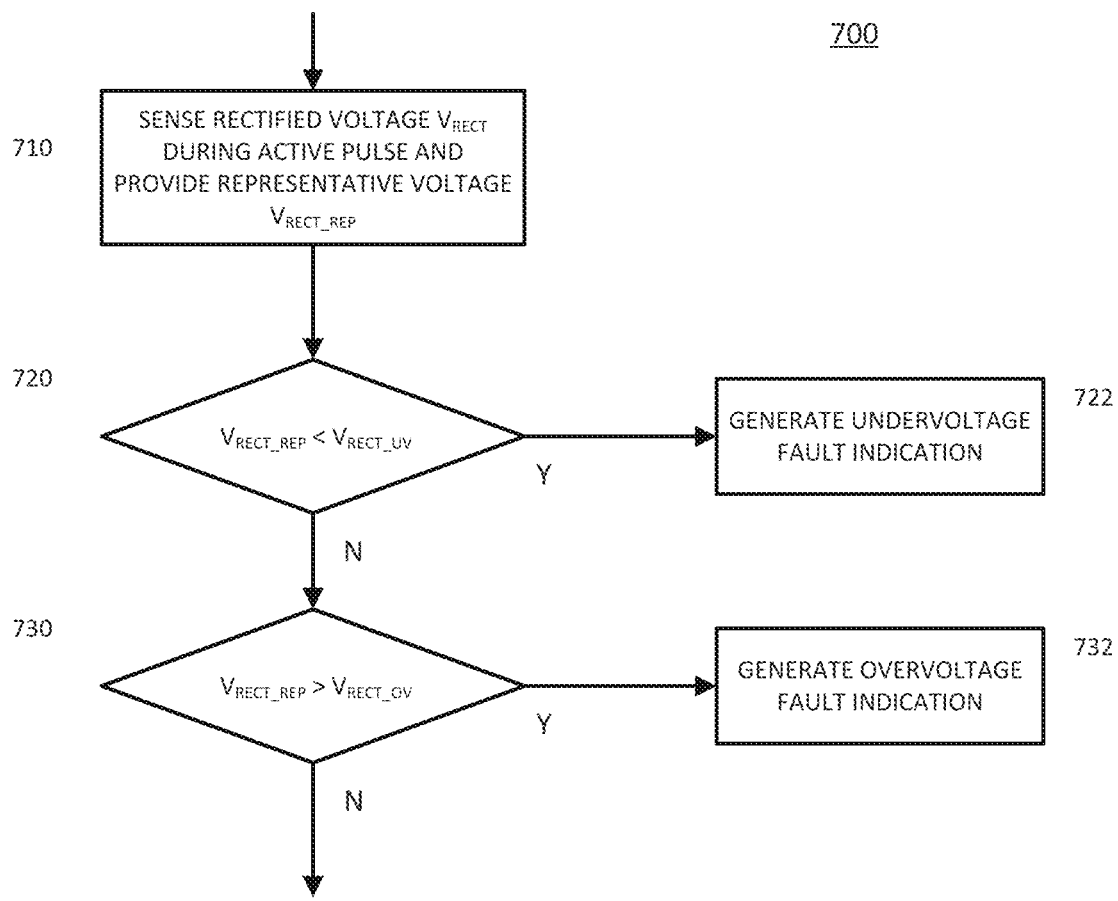
FIG. 7 illustrates a method for detecting undervoltage and overvoltage fault conditions based upon sensing a rectified voltage on the secondary side of a power converter.

FIG. 7 illustrates a method 700 for detecting undervoltage or overvoltage faults. The method begins by sensing 710 a rectified voltage $V_{RECT}$ during an active pulse. Such sensing may be accomplished by sampling and digitizing the rectified voltage $V_{RECT}$. In some sub-embodiments, a representative voltage $V_{RECT\_REP}$ of the active pulse may be taken from a single sample, whereas in other sub-embodiments multiple samples are filtered to produce a representative voltage. The representative voltage $V_{RECT\_REP}$ is compared 720 against an undervoltage threshold $V_{RECT\_UV}$. If the representative voltage $V_{RECT\_REP}$ is lower than the undervoltage threshold $V_{THR\_UV}$, an undervoltage fault indication is generated 722. Otherwise, the representative voltage $V_{RECT\_REP}$ is compared 730 against an overvoltage threshold $V_{REC\_OV}$. If the representative voltage $V_{RECT\_REP}$ is higher than the overvoltage threshold $V_{THR\_OV}$, an overvoltage fault indication is generated 732.

Figure 8:
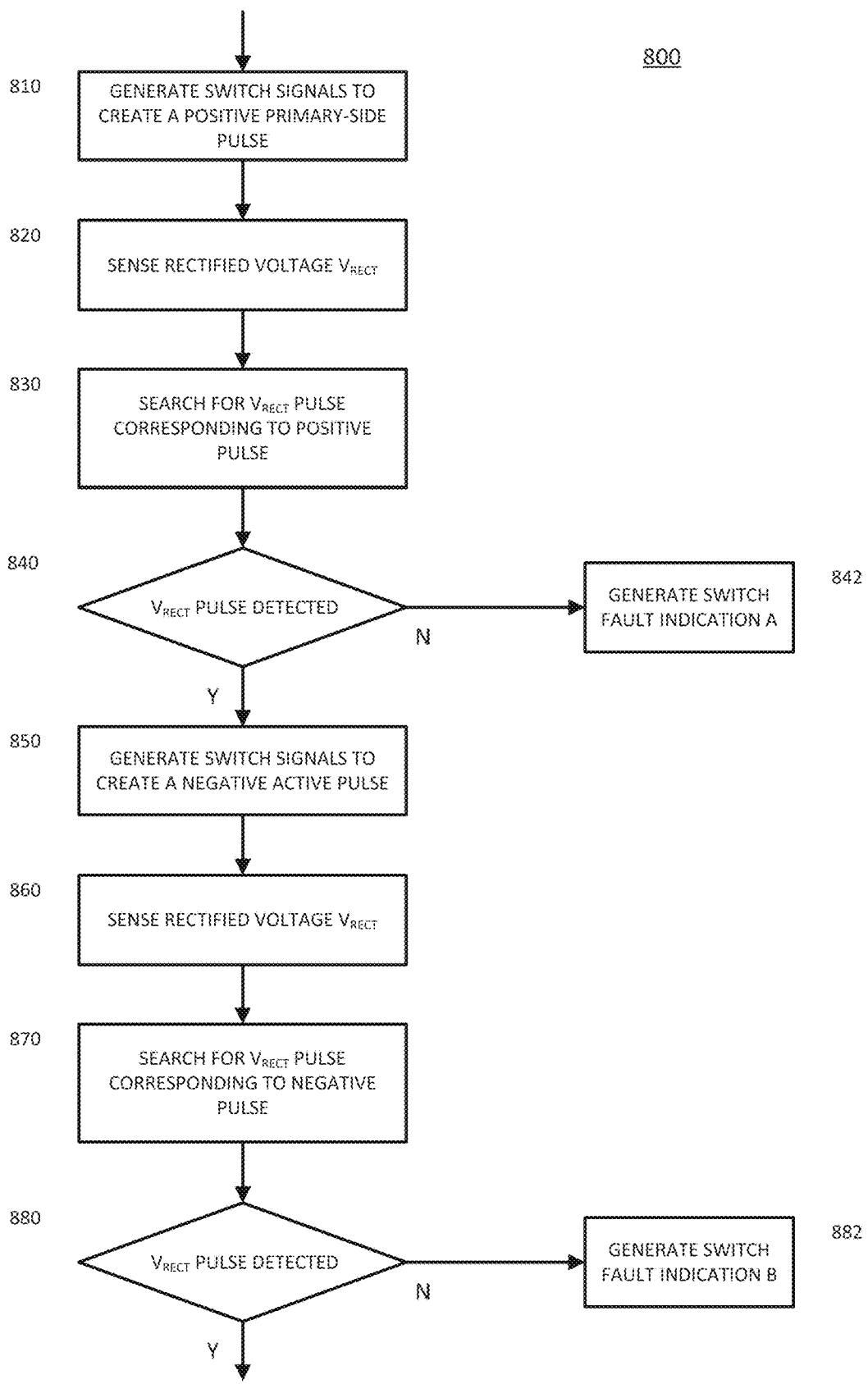
FIG. 8 illustrates a method for detecting switch faults based upon sensing a rectified voltage on the secondary side of a power converter.

FIG. 8 illustrates a method 800 for detecting missing pulses within a rectified voltage $V_{RECT}$. The method begins by generating 810 switch control signals directing a primary-side power stage to apply a positive voltage pulse on the primary side of a transformer. A rectified voltage $V_{RECT}$ on the secondary side of the transformer is sensed (measured) 820, and the rectified voltage $V_{RECT}$ is searched 830 for a rectified voltage pulse corresponding to the positive voltage pulse applied on the primary side of the transformer. If such a rectified voltage pulse is not detected 840, a switch fault indication is generated 842. Otherwise, the method continues by generating 850 switch control signals directing a primary-side power stage to apply a negative voltage pulse on the primary side of a transformer. The rectified voltage $V_{RECT}$ is then sensed (measured) 860, and the rectified voltage $V_{RECT}$ is searched 870 for a rectified voltage pulse corresponding to the negative voltage pulse applied on the primary side of the transformer. If such a rectified voltage pulse is not detected 880, a switch fault indication is generated 882. The switch fault indications 842, 882 may be the same, or may be different, e.g., indicate a specific fault corresponding to the missing positive or negative primary-side pulse.

Figure 9:
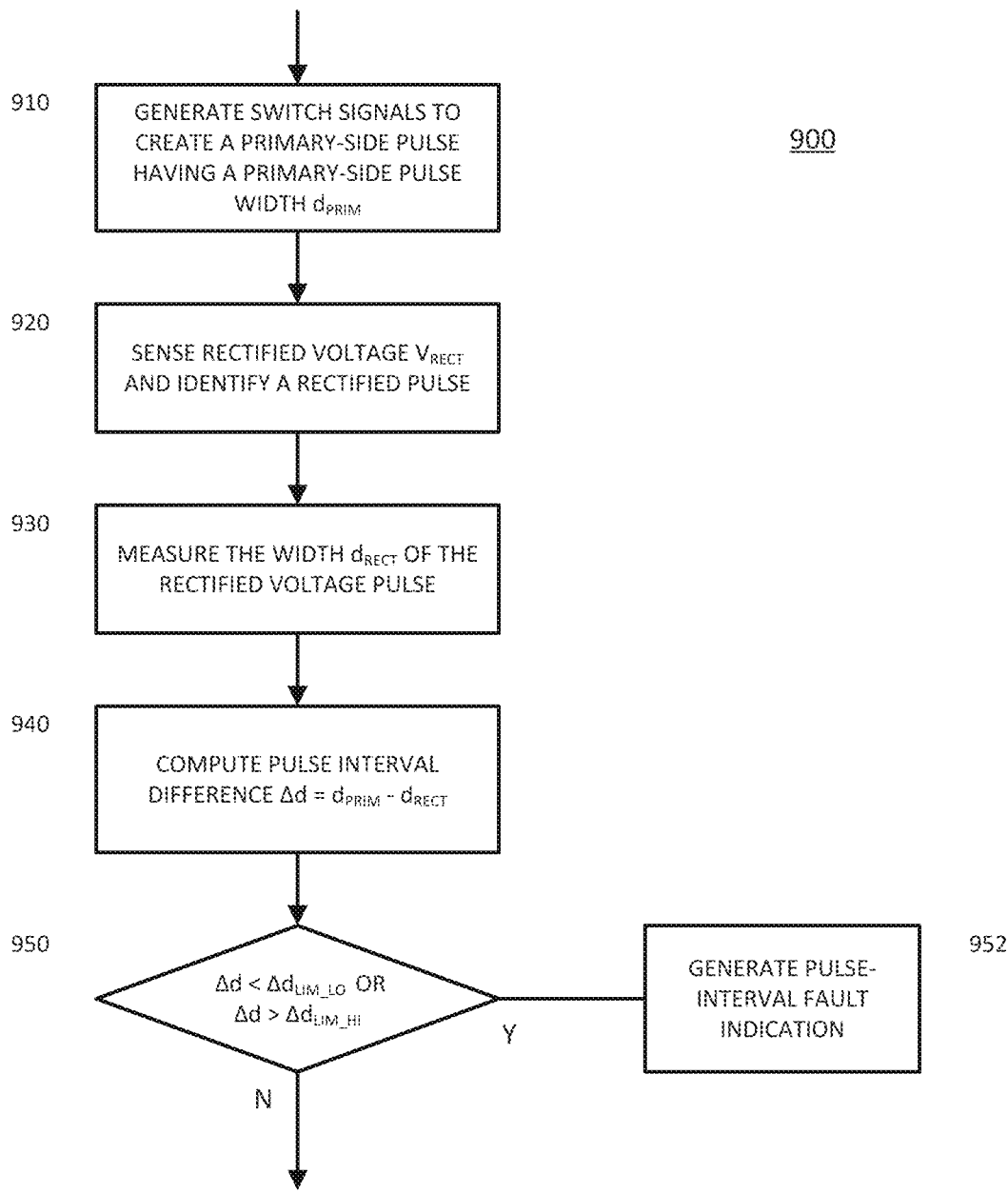
FIG. 9 illustrates a method for detecting pulse width faults based on a sensing of a rectified voltage on the secondary side of a power converter.

FIG. 9 illustrates a method 900 for detecting anomalies in the pulse width of a pulse of a rectified voltage $V_{RECT}$. In particular, the switch control signals generated by a controller, e.g., the PWM generator 178 of FIG. 1, direct a power stage to apply a primary-side voltage pulse to a transformer, wherein this voltage pulse has a primary-side pulse width. This should lead to a corresponding pulse in the rectified voltage $V_{RECT}$. The widths of the primary-side and the rectified pulses should be the same. If these pulse widths differ significantly, e.g., beyond a measurement error of 5% or 10%, a primary-side fault is likely. Note that the drivers 112 may be smart drivers, in which case they may alter the timing provided on the control signals, e.g., $V_{CTL\_Q1}$, $V_{CTL\_Q2}$, $V_{CTL\_Q3}$, $V_{CTL\_Q4}$. For example, the drivers 112 and the power stage 110 may include safety mechanisms whereby the switches may be prematurely turned off due to detection of excessive current, excessive heat, anomalous voltage readings, etc. If the drivers 112 alter the control signal timing for any reason, this results in a voltage pulse being applied to the transformer which has a pulse width different from the width that is expected by a secondary-side controller, e.g., the controller 170 in FIG. 1.

The method 900 begins by generating 910 switch control signals directing a primary-side power stage, such as the power stage 110 in FIG. 1, to apply a voltage pulse to the primary side of a transformer, wherein the voltage pulse has a primary-side pulse width of $d_{PRIM}$. A rectified voltage $V_{RECT}$ on the secondary side of the transformer is sensed (measured) 920, and a rectified pulse corresponding to the directed primary-side pulse is identified. The width (time interval) of this rectified pulse is measured 930 to provide a rectified pulse width $d_{RECT}$. The difference between the primary-side pulse width and the rectified pulse width is computed 940 according to $\Delta d = d_{PRIM} - d_{RECT}$. This difference is compared 950 against a lower limit $\Delta d_{LIM\_LO}$ and an upper limit $\Delta d_{LIM\_HI}$. If the difference between the expected primary-side pulse width and the rectified pulse width falls outside of this bounds, a pulse-interval fault indication is generated 952. In some embodiments the upper and lower limits limit $\Delta d_{LIM\_LO}$, $\Delta d_{LIM\_HI}$ may be the same.

Start-Up and Shut-Down Operation

The circuits and methods described above primarily describe fault detection during steady-state (normal) operation of a power converter. Such fault detection may not be appropriate for other operating modes of the power converter, e.g., during start-up or shut-down operation. For ease of explanation, such operation is described below in the context of the power converter 100 of FIG. 1, but it should be understood that the techniques also apply to other power converter topologies.

When the power converter 100 first begins its operation, the input voltage $V_{IN}$ may be ramping up to its normal, steady-state value. During such a ramp-up interval, the techniques described above would cause generation of undervoltage fault indications during the ramp-up interval. Such indications may, in turn, cause the power converter 100 to be shut-down such that the power converter 100 may never exit its start-up mode to enter normal operation. To avoid such problems, the power converter 100, upon initially starting operation in a start-up interval, suppresses fault indications generated by the fault detector. For example, the fault detector 180 may be disabled or generated fault indications during the start-up interval may be ignored. Upon detecting that normal operational mode may be entered, the start-up interval may be exited and generation of fault indications (or usage of fault indications) is enabled. Detection that normal operation mode may begin may occur responsive to detecting that the rectified voltage $V_{RECT}$ has reached a normal-operation threshold. Alternatively or in addition, transition to normal operational mode may be conditioned upon the output voltage $V_O$ reaching (or nearly reaching) its target (reference) voltage level.

During a shut-down interval, the fault indications may not be useful and could even cause problems. For example, a fault indication may trigger an attempt to alter an operational mode of the PWM generator during a shut-down of the power converter 100. Such an alteration may be undesirable or harmful, given that the power converter 100 is in the process of shutting down. Hence, during shut-down intervals, the fault detector 180 may be disabled or the generation of certain fault indications may be suppressed or ignored.

Primary-Side Fault Detection in Other Power Converter Topologies

The above embodiments have been described in the context of an isolated power converter having a full-bridge power stage, a center-tapped secondary winding, and a full-wave rectifier. The described fault detection techniques are readily applied to other isolated topologies that are characterized in their use of an inverter to convert an input DC voltage into an AC voltage which is coupled to a transformer using a primary-side power stage or switches, a secondary-side rectifier to convert an AC voltage into a DC voltage using power stages or switches, and an output filter. For example, the primary-side power stage may comprise a half-bridge topology, an active-clamp forward (ACF) topology, or a push-pull topology. The transformer secondary may comprise a center-tapped secondary winding, multiple secondary windings, or a single (non-tapped) secondary winding. Also on the secondary side of the power converter, the rectification circuitry may comprise a half-wave rectifier, a full-wave rectifier, a current doubler, or interleaved rectifiers.

Due to the number of different topology combinations and because the fault detection techniques are the same or similar for different topologies, only a sampling of additional topologies are described below. For each of the topologies, the fault detection techniques comprise sensing at least a first rectified voltage $V_{RECT}$ on the secondary side of a power converter, and detecting a primary-side fault based upon the sensed first rectified voltage. The specific node (or nodes) for sensing the rectified voltage $V_{RECT}$ varies according to the topology. For ease of illustration and description in the power converters of FIGS. 10-18, components that are similar or the same as those described in relation to FIG. 1 are omitted. For example, voltage sensors, isolators, and controller connections are not illustrated in the figures described below, as these elements may be readily extrapolated from the circuit 100 of FIG. 1.

Figure 10:
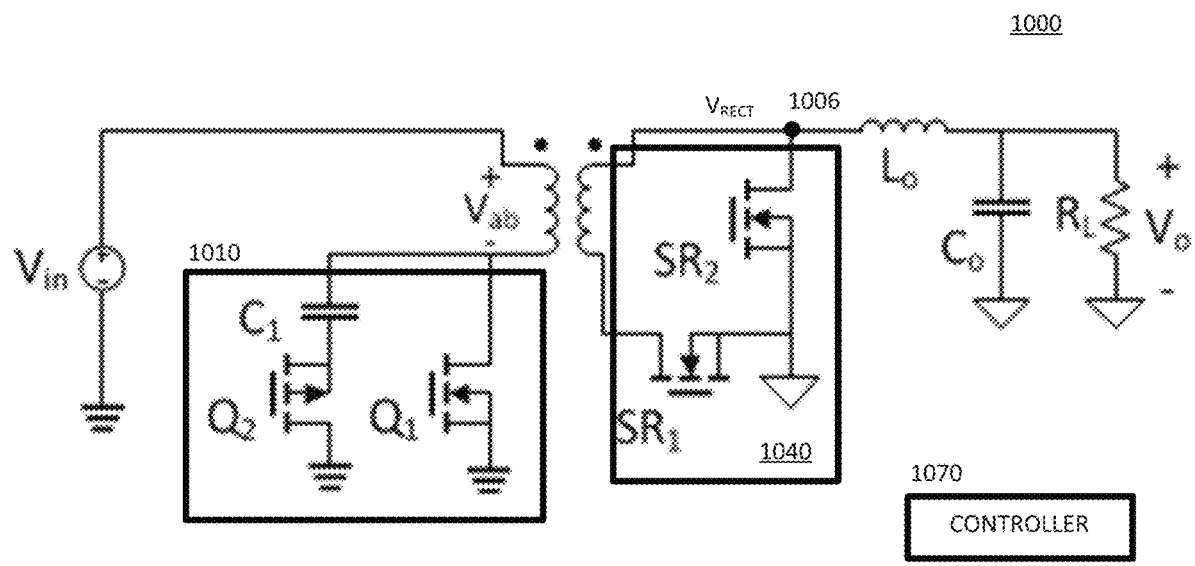
FIG. 10 illustrates a circuit diagram of an isolated switched-mode power converter having an active clamp forward (ACF) topology and half-wave rectifier, and in which faults are detected based upon sensing of a rectified secondary-side voltage.

FIG. 10 illustrates an isolated switched-mode power converter 1000 based upon an active clamp forward (ACF) topology. Unlike the power stage 110 of FIG. 1, the power stage 1010 includes only two power switches $Q_1$, $Q_2$ and a capacitor for coupling the input voltage $V_{IN}$ to the transformer. Also different from the power converter of FIG. 1, the transformer secondary winding has only two terminals and the rectifier 1040 coupled to the secondary winding is a half-wave rectifier. Due to the half-wave rectification, the active pulses at the rectified voltage node 1006 have a maximum duty cycle of 50%. A controller 1070 senses (measures) the rectified voltage $V_{RECT}$ and detects faults using this measured voltage.

Figure 11:
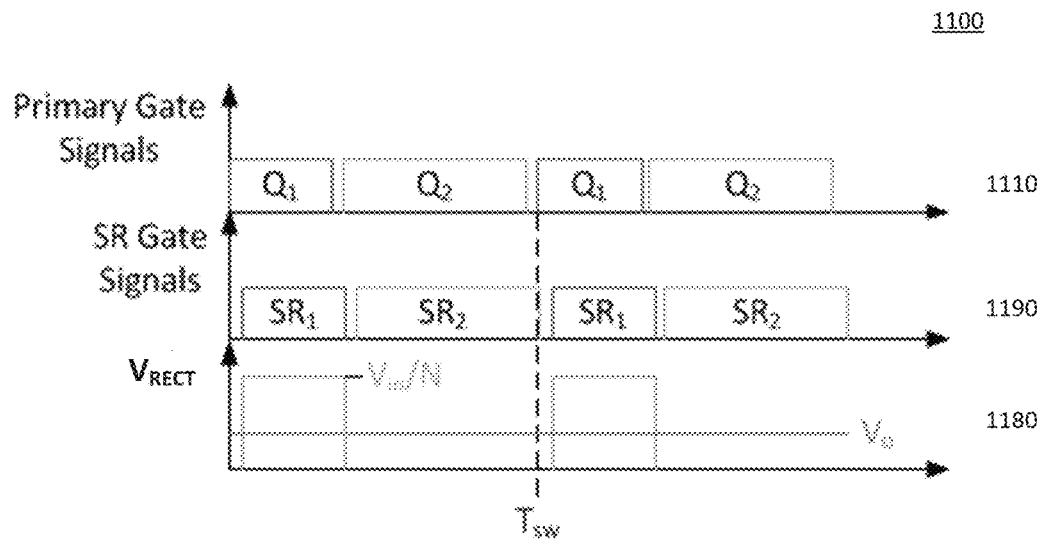
FIG. 11 illustrates waveforms corresponding to voltages and control signals in the power converter of FIG. 10.

FIG. 11 illustrates waveforms 1100 corresponding to the ACF power converter 1000 of FIG. 10. These waveforms 1100 include switch control signals 1110 for coupling, via drivers and isolators that are not shown for ease of illustration, to gates of the power switches $Q_1$, $Q_2$. Also shown are waveforms 1190 corresponding to switch control signals for the synchronous rectification switches SR1, SR2 that are part of the half-wave rectifier 1040. Further shown is a waveform 1180 corresponding to the rectified voltage $V_{RECT}$ at the rectified voltage node 1006. The fault detection techniques sense the rectified voltage $V_{RECT}$ and detect primary-side faults based upon the sensed voltage. For example, if the controller 1070 sensing of the rectified voltage $V_{RECT}$ indicates that the voltage of a pulse within the rectified voltage $V_{RECT}$ is below an undervoltage threshold, an undervoltage fault indication is generated.

The power converter 1000 of FIG. 10 can only transfer power during, at most, half of a switching cycle. As compared with power converters that do not use half-wave rectifiers, this leads to increased ripple in the output voltage $V_O$ or the need for more filtering, e.g., a larger output capacitor $C_O$. These problems may be overcome by interleaving ACF topologies.

Figure 12:
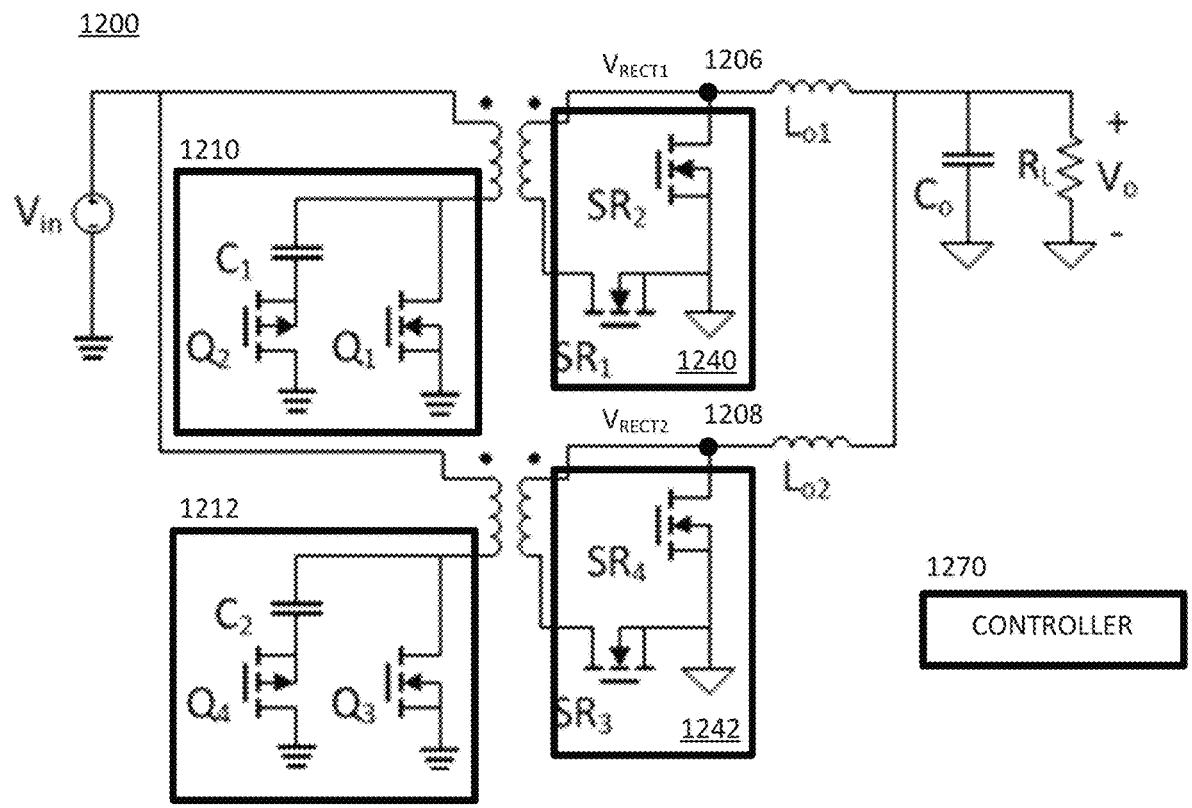
FIG. 12 illustrates a circuit diagram of an isolated switched-mode power converter having interleaved ACF power stages and half-wave rectifiers, and in which faults are detected based upon sensing of rectified secondary-side voltages.
Figure 13:
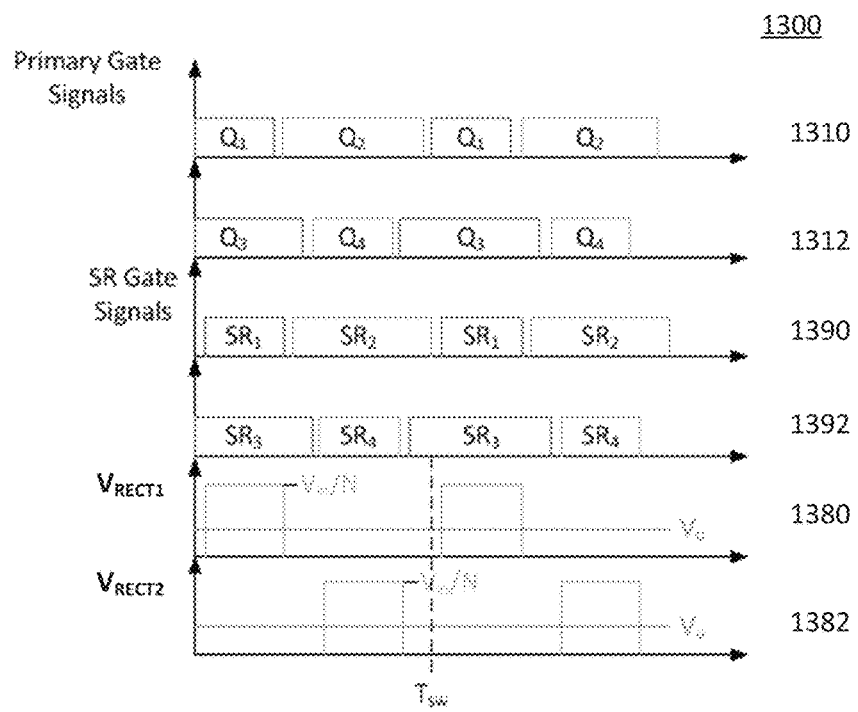
FIG. 13 illustrates waveforms corresponding to voltages and control signals in the power converter of FIG. 12.

FIG. 12 illustrates a power converter 1200 that uses interleaved ACF topologies. The power converter 1200 uses two power stages 1210, 1212 to couple power from the input power source having voltage $V_{IN}$ to two isolation transformers. The secondary windings of the transformers are each coupled to a half-wave rectifier 1240, 1242. As illustrated in FIG. 13, the primary-side power switch control signals 1310, 1312 and the rectification switch control signals 1390, 1392 are interleaved such that rectified voltage $V_{RECT1}$, $V_{RECT2}$ waveforms 1380, 1382 are interleaved. A controller 1270 senses the rectified voltages $V_{RECT1}$, $V_{RECT2}$ at the rectified voltage nodes 1206, 1208 and uses these sensed voltages to detect primary-side faults. The rectified voltages $V_{RECT1}$, $V_{RECT2}$ may be combined, e.g., averaged, summed, before being used for the fault detection, or may each be provided to separate fault detectors within the controller 1270.

Figure 14:
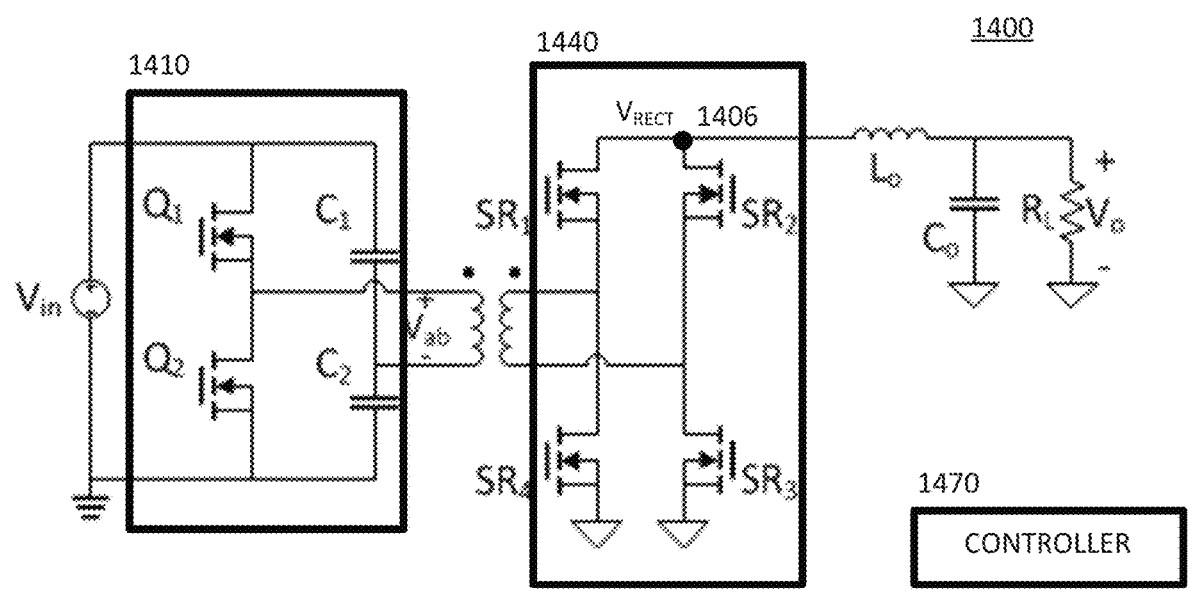
FIG. 14 illustrates a circuit diagram of an isolated switched-mode power converter having a half-bridge power stage and a full-wave rectifier, and in which faults are detected based upon sensing of a rectified secondary-side voltage.
Figure 15:
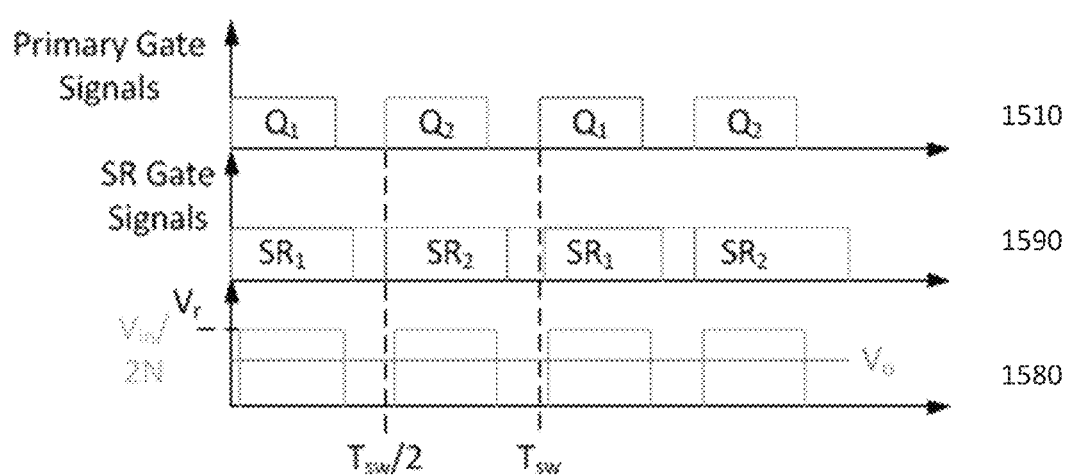
FIG. 15 illustrates waveforms corresponding to voltages and control signals in the power converter of FIG. 14.

FIG. 14 illustrates a power converter 1400 employing a half-bridge power stage 1410 on the primary side and a full-wave rectifier 1440 on the secondary side. The transformer includes a (non-tapped) secondary winding, and four switches SR1, SR2, SR3, SR4 are used to rectify the voltage of the secondary winding. FIG. 15 illustrates waveforms 1500 corresponding to control signals 1510 for the primary-side switches $Q_1$, $Q_2$, corresponding to rectification switch control signals 1590, and corresponding to a rectified voltage $V_{RECT}$ 1580 at the rectified voltage node 1406. As in the previously-described topologies, the rectified voltage $V_{RECT}$ is sensed by a controller 1470 and used to detect primary-side fault conditions.

Figure 16:
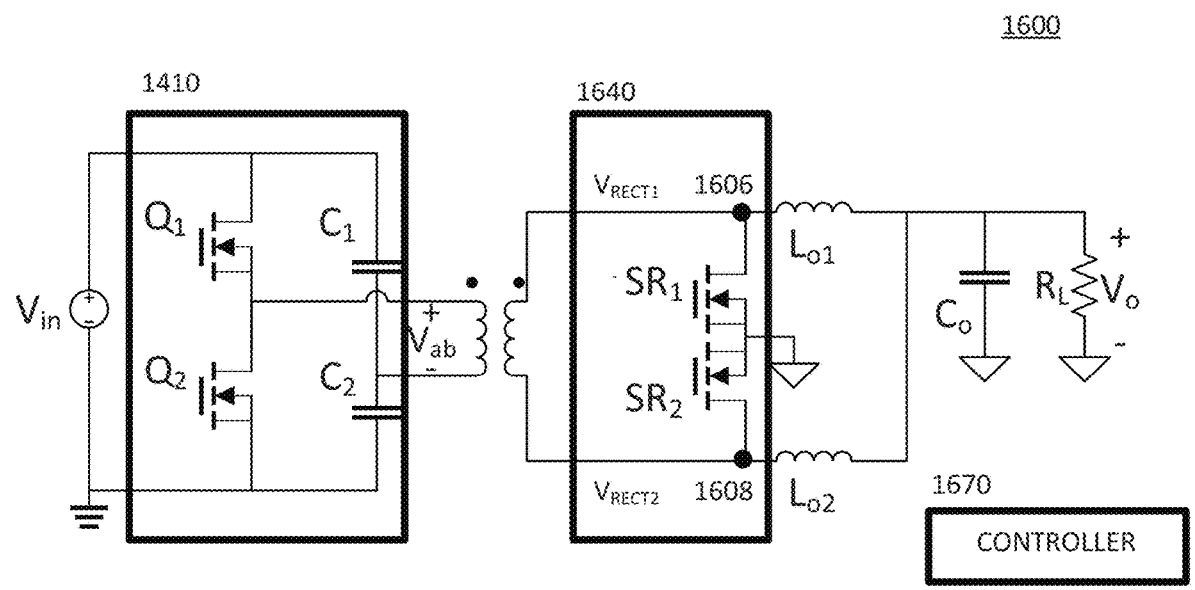
FIG. 16 illustrates a circuit diagram of an isolated switched-mode power converter having a half-bridge power stage and a current-doubler rectifier, and in which faults are detected based upon sensing of a rectified secondary-side voltage.

FIG. 16 illustrates a power converter 1600 which also uses a half-bridge power stage 1410 on its primary side, but which includes a current doubler rectifier 1640 on its secondary side. The current doubler rectifier 1640 is coupled across a secondary winding of the transformer, and comprises rectification switches SR1, SR2. These switches SR1, SR2 alternate between coupling a first and a second terminal of the secondary winding to ground, thereby providing two rectified voltage nodes 1606, 1608. Voltages $V_{RECT1}$, $V_{RECT2}$ at these nodes 1606, 1608 are filtered using output inductors $L_{O1}$, $L_{O2}$ and the output capacitor $C_O$. Relative to other rectification circuits, a current doubler rectifier provides a doubled current and a halved voltage at its outputs.

Figure 17:
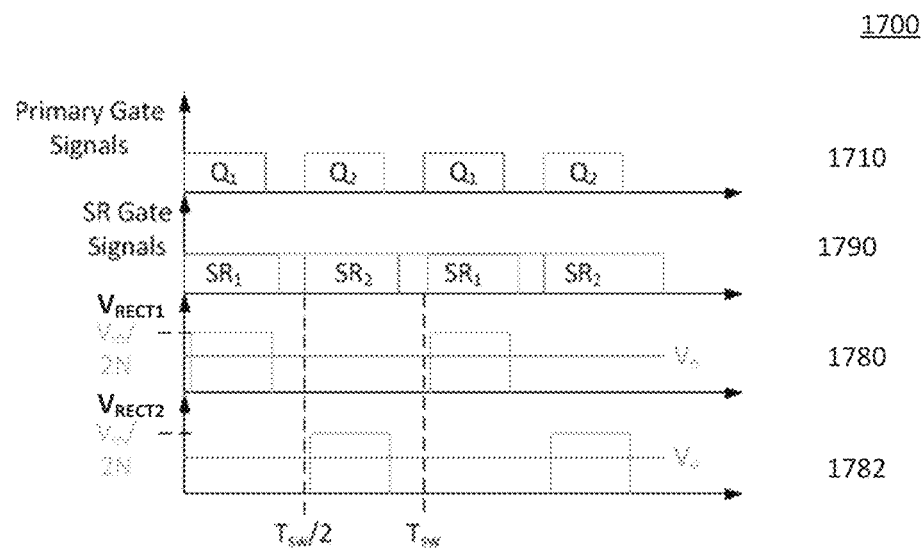
FIG. 17 illustrates waveforms corresponding to voltages and control signals in the power converter of FIG. 16.

FIG. 17 illustrates waveforms 1700 corresponding to control signals 1710 for the primary-side switches $Q_1$, $Q_2$ and waveforms corresponding to control signals 1790 for the rectification switches SR1, SR2. Further illustrated are waveforms 1780, 1782 corresponding to rectified voltages $V_{RECT1}$, $V_{RECT2}$ at the rectified voltage nodes 1606, 1608. A controller 1670 senses the rectified voltages $V_{RECT1}$, $V_{RECT2}$ and detects primary-side fault conditions using these voltages and techniques as described above.

Figure 18:
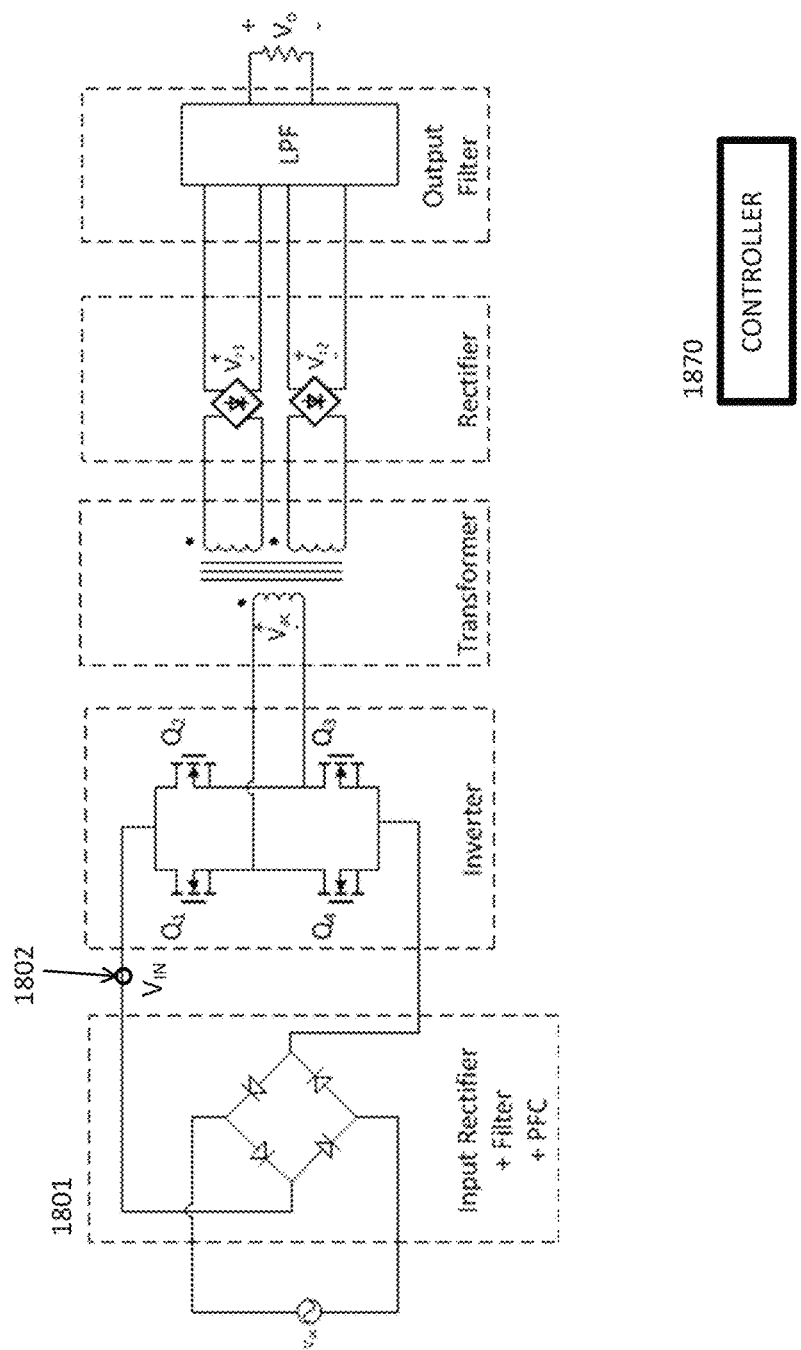
FIG. 18 illustrates a circuit diagram of an isolated switched-mode power converter that is part of an AC-DC converter, and in which faults are detected based upon sensing of a rectified secondary-side voltage.

FIG. 18 illustrates an isolated AC-DC switched-mode power converter 1800. This power converter 1800 differs from those described previously in that an AC power source $V_{AC}$ provides AC power to an input rectifier 1801 which, in turn, supplies a DC input voltage $V_{IN}$ at an input 1802. While not illustrated, the input rectifier 1801 may additionally include power factor correction (PFC) circuitry and/or filtering. The input voltage $V_{IN}$ is supplied to an isolated DC-DC switched-mode power converter which may use various primary-side and secondary-side circuit topologies, including those described above. A secondary-side controller 1870 senses a first rectified voltage $V_{r1}$ and, for some topologies, a second rectified voltage $V_{r2}$, and uses this voltage or these voltages to detect primary-side fault conditions using techniques as described above.

According to an embodiment of a switched-mode power converter having an isolated topology, the power converter converts power from an input source into power for an output load. The power converter comprises a primary side, a transformer, and a secondary side. The primary side includes a power stage which is coupled to the input source and which comprises one or more power switches. The power stage is coupled to a primary winding of the transformer. The secondary side includes a rectifier circuit, a filter circuit, and a controller. The rectifier circuit is coupled to a secondary winding of the transformer, and is configured to provide a first rectified voltage at a first rectified voltage node. The filter circuit is interposed between the first rectified voltage node and an output of the power converter. The filter circuit is configured to filter the first rectified voltage, thereby providing a filtered voltage at the output. The controller is configured to sense the first rectified voltage and, based upon this secondary-side voltage, to detect a primary-side fault condition. Responsive to such detection, a fault indication is generated and/or operation of the switched-mode power converter is modified.

According to an embodiment of an electronic system, the electronic system comprises an input power source, an output load, an isolated switched-mode power converter, and a system manager. The power converter is configured as described above. The system manager is configured to input a fault indication generated by the power converter and, responsive to determining that the fault indication indicates an unsafe operating condition or a condition likely to damage the electronic system, shut down the power converter.

According to any embodiment of the switched-mode power converter or the electronic system, the secondary-side controller is configured to estimate an input voltage of the input source based upon the sensed first rectified voltage.

According to any embodiment of the switched-mode power converter or the electronic system, the fault condition is an undervoltage fault condition and the secondary-side controller is configured to detect a rectified voltage pulse based upon voltage measurements of the sensed first rectified voltage, determine a representative voltage amplitude for the rectified voltage pulse based on the voltage measurements, and detect, responsive to determining that the representative voltage amplitude is lower than an undervoltage threshold, the undervoltage fault condition.

According to any embodiment of the switched-mode power converter or the electronic system, the fault condition is an overvoltage fault condition and the secondary-side controller is configured to detect a rectified voltage pulse based upon voltage measurements of the sensed first rectified voltage, determine a representative voltage amplitude for the rectified voltage pulse based on the voltage measurements, and detect, responsive to determining that the representative voltage amplitude is higher than an overvoltage threshold, the overvoltage fault condition.

According to any embodiment of the switched-mode power converter or the electronic system, the fault condition is a missing-pulse fault condition and the secondary-side controller is configured to generate control signals directing the one or more power switches to apply a primary-side voltage pulse across the primary winding of the transformer; determine, based upon the sensed first rectified voltage, whether the generated control signals and the associated primary-side voltage pulse produced a corresponding rectified voltage pulse at the first rectified voltage node, and detect, responsive to determining that no corresponding rectified voltage pulse was produced, the missing-pulse fault condition.

According to any embodiment of the switched-mode power converter or the electronic system, the fault condition is a voltage-asymmetry fault condition and the secondary-side controller is configured to generate control signals directing the one or more power switches to apply a first primary-side voltage pulse across the primary winding of the transformer, wherein the first primary-side voltage pulse has a first polarity; detect, based on the sensed rectified voltage, a first rectified voltage pulse corresponding to the first primary-side voltage pulse, the first rectified pulse having a first voltage amplitude; generate control signals directing the one or more power switches to apply a second primary-side voltage pulse across the primary winding of the transformer, wherein the second primary-side voltage pulse has a second polarity that is opposite to the first polarity; detect, based on the sensed rectified voltage, a second rectified voltage pulse corresponding to the second primary-side voltage pulse, the second rectified voltage pulse having a second voltage amplitude; determine that a difference between the first and second voltage amplitudes exceeds a voltage difference threshold; and detect, responsive to said determination, the voltage-asymmetry fault condition.

According to any embodiment of the switched-mode power converter or the electronic system, the fault indication is a pulse-interval fault indication and the secondary-side controller is configured to generate control signals directing the one or more power switches to apply a first primary-side voltage pulse, having a first pulse interval, across the primary winding of the transformer; determine, based on the sensed rectified voltage, a first rectified voltage pulse interval corresponding to the first pulse interval; detect that the first rectified voltage pulse interval is outside of an acceptable interval range, wherein the acceptable interval range is based upon the first pulse interval; and detect, responsive to said determination, the pulse-interval fault condition.

According to any embodiment of the switched-mode power converter or the electronic system, the secondary-side controller is configured to generate, during a start-up interval in which the switched-mode power converter operates in a start-up operational mode, control signals directing the one or more power switches to apply primary-side voltage pulses to the primary winding of the transformer; detect, based on the sensed first rectified voltage, rectified voltage pulses; suppress fault indications based on the first rectified voltage pulses during the start-up interval; convert from the start-up operational mode to a normal operational mode, responsive to detecting that a first of the rectified voltage pulses comprises a voltage amplitude, a rectified pulse interval, or both a voltage amplitude and a rectified pulse interval that indicate the normal operational mode may commence; and subsequent to converting to the normal operational mode, ceasing the suppression of the fault indications.

According to any embodiment of the switched-mode power converter or the electronic system, the detected fault condition indicates an unsafe operating condition of the switched-mode power converter, and the secondary-side controller is configured to, responsive to detection of the fault condition, disable generation of switch control signals for controlling the one or more power switches.

According to any embodiment of the switched-mode power converter or the electronic system, the detected fault condition indicates that operation of the switched-mode power converter may proceed with an altered operation, and the secondary-side controller is configured to, responsive to detection of the fault condition, alter an operational mode for generating switch control signals for controlling the one or more power switches.

According to any embodiment of the switched-mode power converter or the electronic system, the secondary-side controller is configured to provide the fault indication to an output of the secondary-side controller.

According to an embodiment of a method, the method is performed within an isolated switched-mode power converter for converting power from an input source into power for an output load. The power converter comprises a primary side, a transformer, and a secondary side. The primary side includes a power stage which is coupled to the input source and which comprises one or more power switches. The power stage is coupled to a primary winding of the transformer. The secondary side includes a rectifier circuit, a filter circuit, and a controller. The rectifier circuit is coupled to a secondary winding of the transformer, and is configured to provide a first rectified voltage at a first rectified voltage node. The filter circuit is interposed between the first rectified voltage node and an output of the power converter. The method comprises sensing the first rectified voltage on the secondary side of the power converter and detecting, based upon this sensed voltage, a primary-side fault condition. The method further comprises generating a fault indication and/or modifying operation of the switched-mode power converter responsive to this detecting.

According to any embodiment of the method, the method further comprises estimating an input voltage of the input source based upon the sensed first rectified voltage.

According to any embodiment of the method, the fault condition is an undervoltage fault condition, and the method further comprises detecting a rectified voltage pulse based upon voltage measurements of the sensed first rectified voltage; determining a representative voltage amplitude for the rectified voltage pulse based on the voltage measurements; and detecting, responsive to determining that the representative voltage amplitude is lower than an undervoltage threshold, the undervoltage fault condition.

According to any embodiment of the method, the fault condition is an overvoltage fault condition, and the method further comprises detecting a rectified voltage pulse based upon voltage measurements of the sensed first rectified voltage; determining a representative voltage amplitude for the rectified voltage pulse based on the voltage measurements; and detecting, responsive to determining that the representative voltage amplitude is higher than an overvoltage threshold, the overvoltage fault condition.

According to any embodiment of the method, the fault condition is a voltage-asymmetry fault condition, and the method further comprises generating control signals directing the one or more power switches to apply a first primary-side voltage pulse across the primary winding of the transformer, wherein the first primary-side voltage pulse has a first polarity; detecting, based on the sensed rectified voltage, a first rectified voltage pulse corresponding to the first primary-side voltage pulse, the first rectified pulse having a first voltage amplitude; generating control signals directing the one or more power switches to apply a second primary-side voltage pulse across the primary winding of the transformer, wherein the second primary-side voltage pulse has a second polarity that is opposite to the first polarity; detecting, based on the sensed rectified voltage, a second rectified voltage pulse corresponding to the second primary-side voltage pulse, the second rectified voltage pulse having a second voltage amplitude; determining that a difference between the first and second voltage amplitudes exceeds a voltage difference threshold; and detecting, responsive to said determination, the voltage-asymmetry fault condition.

According to any embodiment of the method, the fault condition is a pulse-interval fault indication, and the method further comprises generating control signals directing the one or more power switches to apply a first primary-side voltage pulse, having a first pulse interval, across the primary winding of the transformer; determining, based on the sensed rectified voltage, a first rectified voltage pulse interval corresponding to the first pulse interval; detecting that the first rectified voltage pulse interval is outside of an acceptable interval range, wherein the acceptable interval range is based upon the first pulse interval; and detecting, responsive to said determination, a pulse-interval fault condition.

According to any embodiment of the method, the method further comprises generating, during a start-up interval in which the switched-mode power converter operates in a start-up operational mode, control signals directing the one or more power switches to apply primary-side voltage pulses to the primary winding of the transformer; detecting, based on the sensed first rectified voltage, rectified voltage pulses; suppressing fault indications based on the first rectified voltage pulses during the start-up interval; converting from the start-up operational mode to a normal operational mode, responsive to detecting that a first of the rectified voltage pulses comprises a voltage amplitude, a rectified pulse interval, or both a voltage amplitude and a rectified pulse interval that indicate the normal operational mode may commence; and subsequent to converting to the normal operational mode, ceasing the suppression of the fault indications.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switched-mode power converter using an isolated topology for converting power from an input source into power for an output load, the switched-mode power converter comprising:
   a primary side including a power stage coupled to the input source and comprising one or more power switches;
   a transformer comprising a primary winding coupled to the power stage, and a secondary winding; and
   a secondary side including:
      a rectifier circuit coupled to the secondary winding and configured to provide a first rectified voltage at a first rectified voltage node,
      a filter circuit interposed between the first rectified voltage node and an output of the switched-mode power converter, the filter circuit configured to filter the first rectified voltage, thereby providing a filtered voltage at the output, and
      a secondary-side controller configured to:
         generate control signals to control the power stage during a steady-state operational mode, so as to regulate the filtered voltage at the output;
         sense the first rectified voltage;
         detect, during the steady-state operational mode, a fault condition of the primary side, based upon the first rectified voltage sensed on the secondary side; and
         generate a fault indication and/or modify operation of the switched-mode power converter responsive to said detection.

2. The switched-mode power converter of claim 1, wherein the secondary-side controller is configured to estimate an input voltage of the input source based upon the sensed first rectified voltage.

3. The switched-mode power converter of claim 2, wherein the fault condition is an undervoltage fault condition and wherein estimating the input voltage comprises:
   detecting a rectified voltage pulse based upon voltage measurements of the sensed first rectified voltage;
   determining a representative voltage amplitude for the rectified voltage pulse based on the voltage measurements; and
   estimating the input voltage based upon the representative voltage amplitude,
   and wherein the secondary-side controller is further configured to:
   detect, responsive to determining that the estimated input voltage is lower than an undervoltage threshold, the undervoltage fault condition.

4. The switched-mode power converter of claim 2, wherein the fault condition is an overvoltage fault condition and wherein estimating the input voltage comprises:
   detecting a rectified voltage pulse based upon voltage measurements of the sensed first rectified voltage;
   determining a representative voltage amplitude for the rectified voltage pulse based on the voltage measurements; and
   estimating the input voltage based upon the representative voltage amplitude,
   and wherein the secondary-side controller is further configured to:
   detect, responsive to determining that the estimated input voltage is higher than an overvoltage threshold, the overvoltage fault condition.

5. The switched-mode power converter of claim 1, wherein the fault condition is a missing-pulse fault condition and wherein the secondary-side controller is configured to:
   generate control signals directing the one or more power switches to apply a primary-side voltage pulse across the primary winding of the transformer;
   determine, based upon the sensed first rectified voltage, whether the generated control signals and the associated primary-side voltage pulse produced a corresponding rectified voltage pulse at the first rectified voltage node; and
   detect, responsive to determining that no corresponding rectified voltage pulse was produced, the missing-pulse fault condition.

6. The switched-mode power converter of claim 1, wherein the fault condition is a voltage-asymmetry fault condition and wherein the secondary-side controller is configured to:
   generate control signals directing the one or more power switches to apply a first primary-side voltage pulse across the primary winding of the transformer, wherein the first primary-side voltage pulse has a first polarity;

detect, based on the sensed rectified voltage, a first rectified voltage pulse corresponding to the first primary-side voltage pulse, the first rectified pulse having a first voltage amplitude;

generate control signals directing the one or more power switches to apply a second primary-side voltage pulse across the primary winding of the transformer, wherein the second primary-side voltage pulse has a second polarity that is opposite to the first polarity;

detect, based on the sensed rectified voltage, a second rectified voltage pulse corresponding to the second primary-side voltage pulse, the second rectified voltage pulse having a second voltage amplitude;

determine that a difference between the first and second voltage amplitudes exceeds a voltage difference threshold; and detect, responsive to said determination, the voltage-asymmetry fault indication.

7. The switched-mode power converter of claim 1, wherein the fault indication is a pulse-interval fault indication and wherein the secondary-side controller is configured to:

generate control signals directing the one or more power switches to apply a first primary-side voltage pulse, having a first pulse interval, across the primary winding of the transformer;

determine, based on the sensed rectified voltage, a first rectified voltage pulse interval corresponding to the first pulse interval;

detect that the first rectified voltage pulse interval is outside of an acceptable interval range, wherein the acceptable interval range is based upon the first pulse interval; and detect, responsive to said determination, the pulse-interval fault indication.

8. The switched-mode power converter of claim 1, wherein the secondary-side controller is configured to:

generate, during a start-up interval in which the switched-mode power converter operates in a start-up operational mode, control signals directing the one or more power switches to apply primary-side voltage pulses to the primary winding of the transformer;

detect, based on the sensed first rectified voltage, rectified voltage pulses;

suppress fault indications based on the first rectified voltage pulses during the start-up interval;

convert from the start-up operational mode to a normal operational mode, responsive to detecting that a first of the rectified voltage pulses comprises a voltage amplitude, a rectified pulse interval, or both a voltage amplitude and a rectified pulse interval that indicate the normal operational mode may commence; and subsequent to converting to the normal operational mode, ceasing the suppression of the fault indications.

9. The switched-mode power converter of claim 1, wherein the detected fault condition indicates an unsafe operating condition of the switched-mode power converter; and wherein the secondary-side controller is configured to, responsive to detection of the fault condition, disable generation of switch control signals for controlling the one or more power switches.

10. The switched-mode power converter of claim 1, wherein the detected fault condition indicates that operation of the switched-mode power converter may proceed with an altered operation; and wherein the secondary-side controller is configured to, responsive to detection of the fault condition, alter an operational mode for generating switch control signals for controlling the one or more power switches.

11. The switched-mode power converter of claim 1, wherein the secondary-side controller is configured to:

provide the generated fault indication to an output of the secondary-side controller.

12. An electronic system comprising:

an input power source;

an output load;

a switched-mode power converter using an isolated topology for converting power from the input power source into power for the output load, the switched-mode power converter comprising:

a power stage coupled to the input source and comprising one or more power switches;

a transformer comprising a primary winding coupled to the power stage, and a secondary winding;

a rectifier circuit coupled to the secondary winding and configured to provide a first rectified voltage at a first rectified voltage node;

a filter circuit interposed between the first rectified voltage node and an output of the switched-mode power converter, and configured to filter the first rectified voltage, thereby providing a filtered voltage at the output; and a secondary-side controller configured to:

generate control signals to control the power stage during a steady-state operational mode, so as to regulate the filtered voltage at the output;

sense the first rectified voltage;

detect, during the steady-state operational mode, a fault condition within the switched-mode power converter based upon the sensed first rectified voltage; and generate a fault indication responsive to said detection; and a secondary-side system manager configured to:

input the fault indication; and responsive to determining that the fault indication indicates an unsafe operating condition or a condition likely to damage the electronic system, shut down the switched-mode power converter.

13. The electronic system of claim 12, wherein the system manager is configured to:

responsive to determining that the fault indication is a warning signal, alter an operational mode for generating switch control signals for controlling the one or more power switches.

14. A method within an isolated switched-mode power converter for converting power from an input source into power for an output load, wherein the power converter comprises a primary side including a power stage coupled to the input source and comprising one or more power switches, a transformer comprising a primary winding coupled to the power stage and a secondary winding, and a secondary side including a rectifier circuit coupled to the secondary winding and configured to provide a first rectified voltage at a first rectified voltage node, a filter circuit interposed between the first rectified voltage node and an output of the switched-mode power converter, the method comprising:

generating control signals to control the power stage during a steady-state operational mode, so as to regulate the filtered voltage at the output;

sensing the first rectified voltage;

detecting, during the steady-state operational mode, a fault condition of the primary side, based upon the first rectified voltage sensed on the secondary side; and generating a fault indication and/or modifying operation of the switched-mode power converter responsive to said detecting.

15. The method of claim 14, further comprising:

estimating an input voltage of the input source based upon the sensed first rectified voltage.

16. The method of claim 15, wherein the fault condition is an undervoltage fault indication, and wherein estimating the input voltage comprises:

detecting a rectified voltage pulse based upon voltage measurements of the sensed first rectified voltage;

determining a representative voltage amplitude for the rectified voltage pulse based on the voltage measurements; and estimating the input voltage based upon the representative voltage amplitude, wherein the method further comprises:

detecting, responsive to determining that the estimated input voltage is lower than an undervoltage threshold, the undervoltage fault condition.

17. The method of claim 15, wherein the fault condition is an overvoltage fault condition, and wherein estimating the input voltage comprises:

detecting a rectified voltage pulse based upon voltage measurements of the sensed first rectified voltage;

determining a representative voltage amplitude for the rectified voltage pulse based on the voltage measurements; and estimating the input voltage based upon the representative voltage amplitude, wherein the method further comprises:

detecting, responsive to determining that the estimated input voltage is higher than an overvoltage threshold, the overvoltage fault condition.

18. The method of claim 14, wherein the fault condition is a voltage-asymmetry fault condition, the method further comprising:

generating control signals directing the one or more power switches to apply a first primary-side voltage pulse across the primary winding of the transformer, wherein the first primary-side voltage pulse has a first polarity;

detecting, based on the sensed rectified voltage, a first rectified voltage pulse corresponding to the first primary-side voltage pulse, the first rectified pulse having a first voltage amplitude;

generating control signals directing the one or more power switches to apply a second primary-side voltage pulse across the primary winding of the transformer, wherein the second primary-side voltage pulse has a second polarity that is opposite to the first polarity;

detecting, based on the sensed rectified voltage, a second rectified voltage pulse corresponding to the second primary-side voltage pulse, the second rectified voltage pulse having a second voltage amplitude;

determining that a difference between the first and second voltage amplitudes exceeds a voltage difference threshold; and detecting, responsive to said determination, the voltage-asymmetry fault condition.

19. The method of claim 14, wherein the fault condition is a pulse-interval fault indication, the method further comprising:

generating control signals directing the one or more power switches to apply a first primary-side voltage pulse, having a first pulse interval, across the primary winding of the transformer;

determining, based on the sensed rectified voltage, a first rectified voltage pulse interval corresponding to the first pulse interval;

detecting that the first rectified voltage pulse interval is outside of an acceptable interval range, wherein the acceptable interval range is based upon the first pulse interval; and detecting, responsive to said determination, the pulse-interval fault condition.

20. The method of claim 14, further comprising:

generating, during a start-up interval in which the switched-mode power converter operates in a start-up operational mode, control signals directing the one or more power switches to apply primary-side voltage pulses to the primary winding of the transformer;

detecting, based on the sensed first rectified voltage, rectified voltage pulses;

suppressing fault indications based on the first rectified voltage pulses during the start-up interval;

converting from the start-up operational mode to a normal operational mode, responsive to detecting that a first of the rectified voltage pulses comprises a voltage amplitude, a rectified pulse interval, or both a voltage amplitude and a rectified pulse interval that indicate the normal operational mode may commence; and subsequent to converting to the normal operational mode, ceasing the suppression of the fault indications.

* * * * *